United States Patent
Yoshida et al.

(10) Patent No.: US 11,837,978 B2
(45) Date of Patent: Dec. 5, 2023

(54) POWER WIRING NETWORK APPARATUS

(71) Applicant: ZEON CORPORATION, Tokyo (JP)

(72) Inventors: Masayoshi Yoshida, Tokyo (JP); Naomi Shiga, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 666 days.

(21) Appl. No.: 16/981,697

(22) PCT Filed: Mar. 15, 2019

(86) PCT No.: PCT/JP2019/010967
§ 371 (c)(1),
(2) Date: Sep. 17, 2020

(87) PCT Pub. No.: WO2019/188449
PCT Pub. Date: Oct. 3, 2019

(65) Prior Publication Data
US 2021/0099107 A1 Apr. 1, 2021

(30) Foreign Application Priority Data
Mar. 30, 2018 (JP) .............................. 2018-069845

(51) Int. Cl.
H02N 99/00 (2006.01)
H04B 3/02 (2006.01)
H04L 7/00 (2006.01)

(52) U.S. Cl.
CPC .............. *H02N 99/00* (2013.01); *H04B 3/02* (2013.01); *H04L 7/0008* (2013.01)

(58) Field of Classification Search
CPC ........ H02N 99/00; H04B 3/02; H04L 7/0008; H02J 13/00002; H02J 50/001
See application file for complete search history.

(56) References Cited

U.S. PATENT DOCUMENTS

| 2015/0063473 A1* | 3/2015 | Nishibayashi | .......... H02J 13/00 375/257 |
| 2017/0222436 A1* | 8/2017 | Wendt | ....................... H02J 1/08 |

FOREIGN PATENT DOCUMENTS

| CN | 107078502 A | 8/2017 |
| JP | 2012205078 A | 10/2012 |

(Continued)

OTHER PUBLICATIONS

Oct. 6, 2020, International Preliminary Report on Patentability issued in the International Patent Application No. PCT/JP2019/010967.

(Continued)

*Primary Examiner* — Jeffrey M Shin
(74) *Attorney, Agent, or Firm* — KENJA IP LAW PC

(57) ABSTRACT

The present disclosure aims to provide a power wiring network apparatus capable of constructing a highly portable power wiring network, without the need to maintain infrastructure. A power wiring network apparatus includes a wiring member, including first connectors and a conductive portion electrically connecting the first connectors to enable power supply, and circuit elements each including a second connector mechanically and electrically attachable to any first connector. The circuit elements include energy harvesting elements capable of outputting, from the second connector, power generated by energy harvesting and load elements capable of consuming power inputted from the second connector. At least some energy harvesting elements and load elements are capable of power line data communication via a power line including the first connectors and conductive portion.

20 Claims, 24 Drawing Sheets

(56) References Cited

FOREIGN PATENT DOCUMENTS

| JP | 2017127190 A | 7/2017 |
|----|--------------|--------|
| JP | 2017523758 A | 8/2017 |

OTHER PUBLICATIONS

Dec. 1, 2021, the Extended European Search Report issued by the European Patent Office in the corresponding European Patent Application No. 19776463.2.
May 28, 2019, International Search Report issued in the International Patent Application No. PCT/JP2019/010967.

* cited by examiner

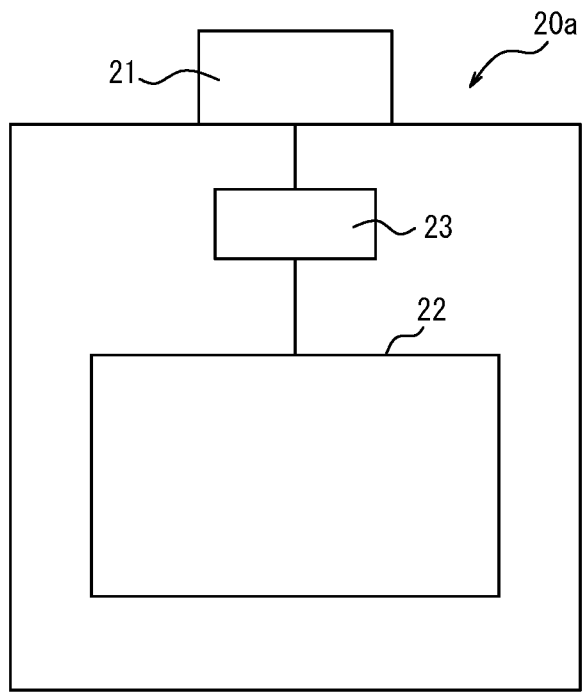
FIG. 2A
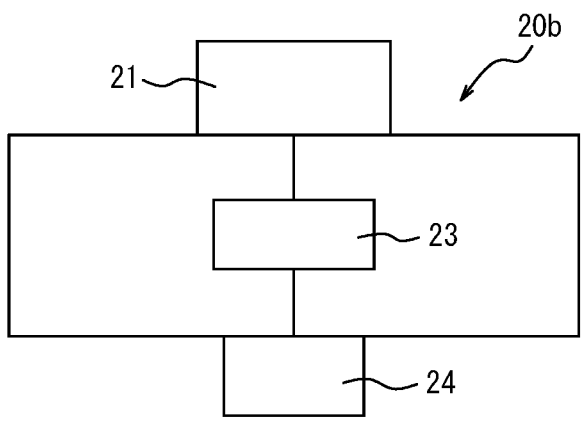
FIG. 2B
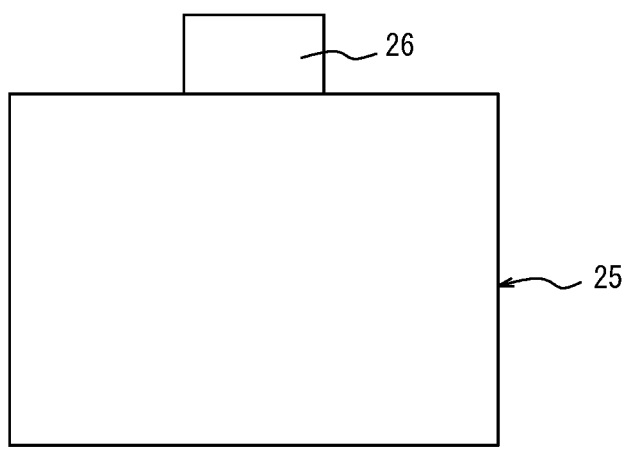

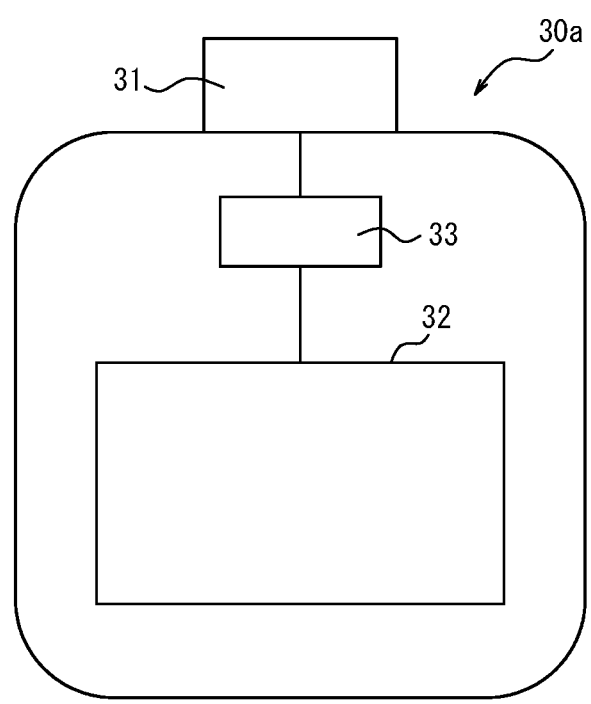
FIG. 3A
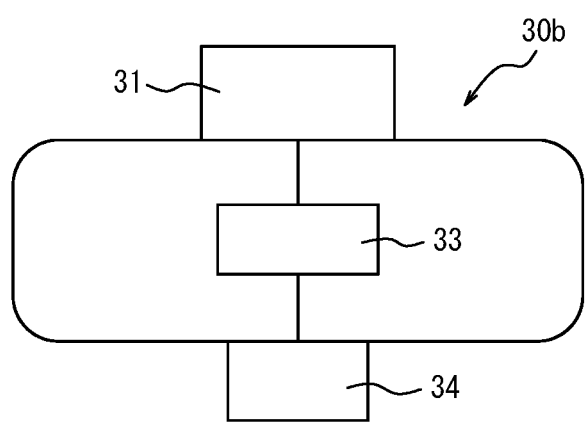
FIG. 3B
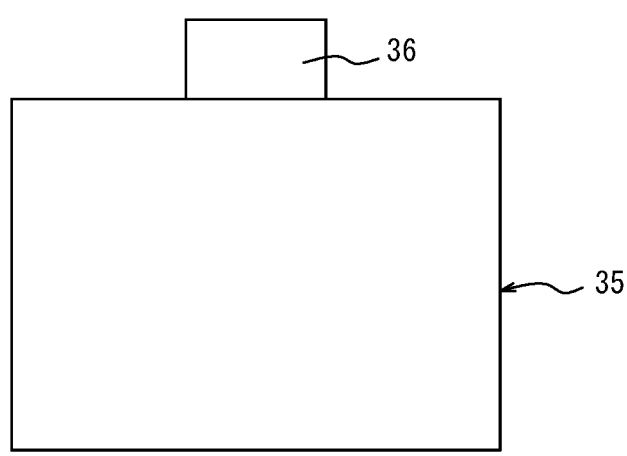

POWER WIRING NETWORK APPARATUS

CROSS-REFERENCE TO RELATED APPLICATION

The present application claims priority to and the benefit of Japanese Patent Application No. 2018-69845 filed Mar. 30, 2018, the entire contents of which are incorporated herein by reference.

TECHNICAL FIELD

The present disclosure relates to a power wiring network apparatus.

BACKGROUND

In recent years, progress has been made in developing a communication method for transmitting a high frequency signal as a communication signal over a power line. For example, patent literature (PTL) 1 discloses a solar power generation monitoring system for use in a solar power generation system that aggregates and sends the output from a plurality of solar cell panels to a power conversion apparatus. In the monitoring system, a power line communication function is implemented by a lower-level communication apparatus that transmits measurement data from a measurement apparatus for measuring the power generation of solar cell panels and an upper-level communication apparatus that receives the measurement data transmitted by the lower-level communication apparatus.

CITATION LIST

Patent Literature

PTL 1: JP 2012-205078 A

SUMMARY

Technical Problem

In the system disclosed in PTL 1, however, the communication apparatuses need to be connected to the power line of the solar power generation system, i.e. to the infrastructure. The portability of a device is therefore impaired if the device is to perform power line communication, making the system inconvenient.

The present disclosure therefore aims to resolve the above-described problem and provide a power wiring network apparatus capable of constructing a power network with excellent portability, without the need to maintain infrastructure.

Solution to Problem

The present disclosure aims to resolve the aforementioned problem advantageously. A power wiring network apparatus of the present disclosure includes a wiring member including a plurality of first connectors and a conductive portion electrically connecting the plurality of first connectors in a manner capable of supplying power, and a plurality of circuit elements each including a second connector mechanically and electrically attachable to and detachable from any first connector among the plurality of first connectors. The plurality of circuit elements includes an energy harvesting element as a circuit element capable of outputting, from the second connector, power generated by energy harvesting and a load element as a circuit element capable of consuming power inputted from the second connector. At least some of the energy harvesting elements and the load elements are capable of power line data communication via a power line including the first connector and the conductive portion. This configuration enables the construction of a power wiring network with excellent portability, without the need to maintain infrastructure.

In the power wiring network apparatus of the present disclosure, the energy harvesting element preferably includes a first transmitter configured to transmit data via the second connector. This configuration enables another circuit element to be notified, via the first transmitter, that the energy harvesting element is connected to the network. Furthermore, the state of the energy harvesting element can be transmitted to another circuit element, enabling efficient use of the power generated by the energy harvesting element.

In the power wiring network apparatus of the present disclosure, at least one load element preferably includes a second transmitter configured to transmit data via the second connector and/or includes a receiver configured to receive data. This configuration enables another circuit element to be notified, via the second transmitter, that the load element is connected to the network. Furthermore, the load element can receive a command via the receiver, enabling the user to operate the load element by power line communication.

In the power wiring network apparatus of the present disclosure, the first transmitter or the second transmitter is preferably capable of transmitting a signal yielded by digital modulation of transmission data to another circuit element by superimposing the signal on the power line via the second connector. This configuration enables high-speed communication using a power wiring network.

In the power wiring network apparatus of the present disclosure, the receiver is preferably configured to receive, via the second connector, a signal yielded by digital modulation and superimposed on the power line and is preferably configured to demodulate the signal and generate received data. This configuration enables high-speed communication using a power wiring network.

In the power wiring network apparatus of the present disclosure, at least one load element is preferably capable of generating a synchronization signal and of transmitting the synchronization signal to another circuit element, the synchronization signal being for determining a timing of generation of a notification signal for the energy harvesting element or the load element to notify another circuit element that the energy harvesting element or the load element is present. This configuration enables a network management device to easily detect a circuit element in the network.

In the power wiring network apparatus of the present disclosure, the energy harvesting element or the load element is preferably configured to receive the synchronization signal and to transmit the notification signal of the energy harvesting element or the load element to another circuit element during a predetermined period based on the synchronization signal when the energy harvesting element or the load element detects no signal during the predetermined period. This configuration enables stable communication in accordance with current conditions when a circuit element is added during operation of the network. Furthermore, when a circuit element is removed during operation of the network, the network management device can easily detect the removal of the circuit element.

In the power wiring network apparatus of the present disclosure, the notification signal preferably includes attribute data of the energy harvesting element or the load element, and the attribute data is preferably fixed length modulation data. This configuration enables each circuit element to occupy a no-signal period of a fixed length, detected after receipt of the synchronization signal, as the circuit element's own fixed-length attribute data transmission period.

In the power wiring network apparatus of the present disclosure, at least one load element is preferably configured to transmit variable length data including control information of the energy harvesting element or the load element. This configuration enables efficient sharing of the power line communication environment among a plurality of circuit elements.

In the power wiring network apparatus of the present disclosure, at least one energy harvesting element or load element is preferably configured to transmit variable length data including status information of the at least one energy harvesting element or load element. This configuration enables efficient sharing of the power line communication environment among a plurality of circuit elements.

In the power wiring network apparatus of the present disclosure, the circuit elements preferably include a switching element capable of switching a plurality of the power lines between being electrically connected to and disconnected from each other. This configuration enables power lines to be separated into a plurality of local networks or integrated into one network. Accordingly, an entire local network can be added to another network. Furthermore, a plurality of local networks can be continually AC coupled, thereby enabling DC power to be cut off between the local networks by the switching element while network communication is enabled between the local networks.

In the power wiring network apparatus of the present disclosure, the switching element preferably includes a second transmitter configured to transmit data and/or a receiver configured to receive data. This configuration enables another circuit element to be notified, via the second transmitter, that the switching element is connected to the network. Furthermore, the switching element can receive a command via the receiver, enabling the user to operate the switching element by power line communication.

In the power wiring network apparatus of the present disclosure, the load element capable of generating the synchronization signal is preferably further capable of wireless communication by Bluetooth® (Bluetooth is a registered trademark in Japan, other countries, or both). This configuration enables a user to use circuit elements, which are connected to a power wiring network, by communicating wirelessly with a network management device from an external device such as a smartphone.

Advantageous Effect

The present disclosure can provide a power wiring network apparatus capable of constructing a power wiring network with excellent portability, without the need to maintain infrastructure.

BRIEF DESCRIPTION OF THE DRAWINGS

In the accompanying drawings:

FIG. 2A is a schematic view of a first configuration example of an energy harvesting element as a circuit element included in the power wiring network apparatus illustrated in FIG. 1;

FIG. 2B is a schematic view of a second configuration example of an energy harvesting element as a circuit element included in the power wiring network apparatus illustrated in FIG. 1;

FIG. 3A is a schematic view of a first configuration example of a load element as a circuit element included in the power wiring network apparatus illustrated in FIG. 1;

FIG. 3B is a schematic view of a second configuration example of a load element as a circuit element included in the power wiring network apparatus illustrated in FIG. 1;

DETAILED DESCRIPTION

Embodiments of the present disclosure are described below with reference to the drawings. Common components in each drawing are labeled with the same reference sign.

First Embodiment

Figure 1:
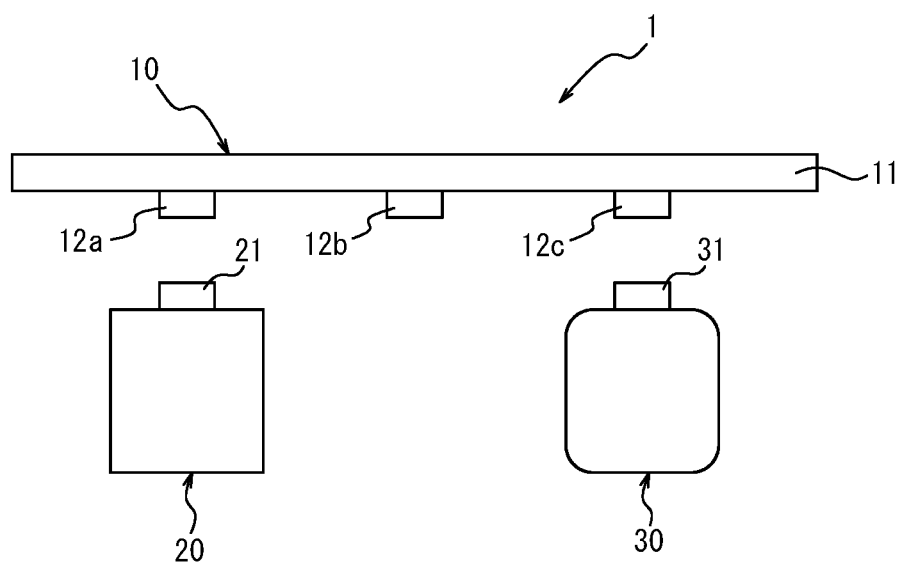
FIG. 1 is a schematic view of a power wiring network apparatus according to a first embodiment of the present disclosure.

FIG. 1 is a schematic diagram of a power wiring network apparatus 1 according to a first embodiment of the present disclosure. As illustrated in FIG. 1, the power wiring network apparatus 1 includes a wiring member 10 and a plurality of circuit elements. The plurality of circuit elements include at least an energy harvesting element 20 and a load element 30, as illustrated in FIG. 1. While details are provided below, each circuit element includes a second connector mechanically and electrically attachable to and detachable from any first connector along a plurality of first connectors 12a, 12b, 12c included in a wiring member 10 (for example, the energy harvesting element 20 includes a second connector 21, and the load element 30 includes a second connector 31). The plurality of circuit elements are electrically connected to each other in parallel via the wiring member 10. In FIG. 1, the shape of each component in the power wiring network apparatus 1 is prescribed for the sake of explanation, but the actual shapes of components are not limited to these shapes. This also applies to each of the drawings described below.

As illustrated in FIG. 1, the wiring member 10 is an elongated member overall that includes an elongated conductive portion 11 and three first connectors 12a, 12b, 12c. In the present embodiment, a power line capable of supplying power from the energy harvesting element 20 to the load element 30 is formed by the conductive portion 11 and the first connectors 12a, 12b, 12c. The power line can, for example, be a two-wire system. The wiring member 10 may include a covering that surrounds the conductive portion 11.

Electric current can flow in the extending direction of the conductive portion 11 along the entire length thereof, for example. The conductive portion 11 includes an electrical conductor. Any electrical conductor may be included in the conductive portion 11. Examples include conductors made of a metal material such as copper, aluminum, gold, silver, nickel, and iron and conductors made of an alloy material including these metal materials. The conductive portion 11 may have sufficient flexibility to bend back at any point in the extending direction or may be rigid. The conductive portion 11 preferably has flexibility to provide the wiring member 10 with a variable shape and improve the degree of design freedom of the power wiring network apparatus 1 overall.

The three first connectors 12a, 12b, 12c are each connected to the conductive portion 11. Accordingly, the three first connectors 12a, 12b, 12c are connected to each other in a conductive manner via the conductive portion 11, i.e. are electrically connected to each other. In the present embodiment, the three first connectors 12a, 12b, 12c are arranged at a distance from each other in the extending direction of the wiring member 10.

FIG. 1 illustrates an example of the wiring member 10 including three first connectors 12a, 12b, 12c, but it suffices for the wiring member 10 to include a plurality of first connectors. In other words, the wiring member 10 may include two first connectors or may include four or more first connectors. In this case, the plurality of first connectors are conductively connected to each other. The plurality of first connectors may be arranged at a distance from each other along the extending direction of the wiring member 10. The plurality of first connectors may, for example, have the same shape. The three first connectors 12a, 12b, 12c are also referred to below as the first connector 12 when no distinction is made therebetween.

As illustrated in FIG. 1, the energy harvesting element 20 includes the second connector 21. The energy harvesting element 20 is capable of outputting, from the second connector 21, power generated by energy harvesting. FIG. 1 illustrates only one energy harvesting element 20, but the power wiring network apparatus 1 may include a plurality of energy harvesting elements 20. When a plurality of energy harvesting elements 20 are provided, the power generation capability of each energy harvesting element 20 may differ.

The second connector 21 is mechanically and electrically attachable to and detachable from any of the first connectors 12 included in the wiring member 10. In the present disclosure, stating that two connectors are "mechanically and electrically attachable and detachable" refers to one of the connectors being attachable to the other connector and being detachable after attachment. In a state in which one connector is attached to the other connector, the two connectors are mechanically and electrically connected to each other. In a state in which one connector is detached from the other connector, the two connectors are mechanically and electrically disconnected from each other.

FIGS. 2A and 2B are schematic views of configuration examples of the energy harvesting element 20 as a circuit element included in the power wiring network apparatus 1. Specifically, FIG. 2A is a schematic view of an energy harvesting element 20a as a first configuration example of the energy harvesting element 20. FIG. 2B is a schematic view of an energy harvesting element 20b as a second configuration example of the energy harvesting element 20.

As illustrated in FIG. 2A, the energy harvesting element 20a as the first configuration example of the energy harvesting element 20 includes an energy harvesting unit 22 and a reverse current prevention unit 23 in addition to the above-described second connector 21. The second connector 21 and the reverse current prevention unit 23 are electrically connected to each other via electrical wiring. The reverse current prevention unit 23 and the energy harvesting unit 22 are electrically connected to each other via electrical wiring. The electrical connection between the second connector 21 and the reverse current prevention unit 23 and the electrical connection between the reverse current prevention unit 23 and the energy harvesting unit 22 may be a direct connection, without the use of electrical wiring.

The energy harvesting unit 22 is capable of generating power by energy harvesting. In other words, the energy harvesting unit 22 generates power in accordance with the external environment. Accordingly, the power generated by the energy harvesting unit 22 changes depending on the external environment. The energy harvesting unit 22 includes a solar cell, for example, that generates power using light energy such as sunlight or room light. Alternatively, the energy harvesting unit 22 may, for example, include a thermoelectric conversion element that generates power using thermal energy such as geothermal energy. The energy harvesting unit 22 outputs the generated power to the second connector 21 via the reverse current prevention unit 23.

The energy harvesting unit 22 of the present embodiment includes a solar cell panel formed by a solar cell. The solar cell panel is a member including a solar cell that photoelectrically converts incident light such as sunlight, room light, or the like and outputs electric power. The types of solar cells included in the solar cell panel are roughly classified into inorganic solar cells in which an inorganic material is used and organic solar cells in which an organic material is used. Examples of inorganic solar cells include silicon (Si) solar cells in which silicon is used and compound solar cells in which a compound is used. Examples of organic solar cells include thin-film solar cells such as low-molecular weight vapor deposition-type solar cells in which an organic pigment is used, polymer coating-type solar cells in which a conductive polymer is used, and coating-conversion-type solar cells in which a conversion-type semiconductor is used; and dye-sensitized solar cells formed from titania, an organic dye, and an electrolyte. Solar cells included in a solar cell panel can also include organic/inorganic hybrid solar cells and solar cells in which a perovskite compound is used. The solar cell panel may be a thin panel. In this case, it is preferable to use a dye-sensitized solar cell, fabricated on a plastic film or the like, which is easy to form as a thin mold. When the solar cell panel is a thin panel, the solar cell panel is not limited to one fabricated on a plastic film or the like; any mode is applicable as long as it is similarly thin. The thickness of the solar cell panel formed as a thin panel is preferably 10 μm or more to 3 mm or less, for example, from the perspective of manufacturing techniques.

The reverse current prevention unit 23 prevents current from the second connector 21 from flowing into the energy harvesting unit 22. The reverse current prevention unit 23 can include a circuit element such as a diode. When a diode is used as the reverse current prevention unit 23, the diode is connected so that the anode is on the energy harvesting unit 22 side, and the cathode is on the second connector 21 side. The collector and the base terminals of a transistor may be connected and paired with the emitter for use as a diode in the reverse current prevention unit 23.

As illustrated in FIG. 2B, the energy harvesting element 20b as the second configuration example of the energy harvesting element 20 includes the reverse current prevention unit 23 and a connector 24 for power generator connection, in addition to the above-described second connector 21. Whereas the energy harvesting element 20a includes the energy harvesting unit 22, the energy harvesting element 20b differs by not including the energy harvesting unit 22.

The reverse current prevention unit 23 included in the energy harvesting element 20b suppresses the flow of current from the second connector 21 into the connector 24 for power generator connection. The remaining configuration is similar to that of the above-described reverse current prevention unit 23 included in the energy harvesting element 20a.

The connector 24 for power generator connection is a connector capable of mechanically and electrically connecting to an external energy harvesting unit 25. The connector 24 for power generator connection may be mechanically and electrically attachable to and detachable from the external energy harvesting unit 25. The connector 24 for power generator connection is not restricted, and a typical connector can be used. A connector conforming to a predetermined standard, such as a connector using a universal serial bus (USB) interface, can also be used.

Apart from including a connector 26, the external energy harvesting unit 25 has a similar configuration to that of the energy harvesting unit 22 included in the above-described energy harvesting element 20a. The connector 26 is a connector capable of mechanically and electrically connecting to the connector 24 for power generator connection. Like the connector 24 for power generator connection, the connector 26 is not restricted.

As illustrated in FIG. 1, the load element 30 includes the second connector 31. The load element 30 is capable of consuming power inputted from the second connector 31. Like the second connector 21 included in the energy harvesting element 20, the second connector 31 is mechanically and electrically attachable to and detachable from any of the first connectors 12 included in the wiring member 10. FIG. 1 illustrates only one load element 30, but the power wiring network apparatus 1 may include a plurality of load elements 30. When a plurality of load elements 30 is included, the power consumption of each load element 30 may differ.

FIGS. 3A and 3B are schematic views of configuration examples of the load element 30 as a circuit element included in the power wiring network apparatus 1. Specifically, FIG. 3A is a schematic view of a load element 30a as a first configuration example of the load element 30. FIG. 3B is a schematic view of a load element 30b as a second configuration example of the load element 30.

As illustrated in FIG. 3A, the load element 30a as the first configuration example of the load element 30 includes a load 32 and a voltage controller 33 in addition to the above-described second connector 31. The second connector 31 and the voltage controller 33 are electrically connected to each other via electrical wiring. The voltage controller 33 and the load 32 are electrically connected to each other via electrical wiring. The electrical connection between the second connector 31 and the voltage controller 33 and the electrical connection between the voltage controller 33 and the load 32 may be a direct connection, without the use of electrical wiring.

The load 32 may be any load capable of consuming power. The load 32 may, for example, be an electronic device, such as a radio; an LED light; or the like. The power consumed by the load 32 may change depending on factors such as the drive state of the load 32.

The voltage controller 33 controls the power inputted from the second connector 31 to be a predetermined voltage and outputs the result to the load 32. In greater detail, the voltage controller 33 steps down or steps up the power inputted from the second connector 31 to a predetermined voltage suitable for driving the load 32, such as the rated voltage of the load 32, and outputs the result to the load 32.

As illustrated in FIG. 3B, the load element 30b as the second configuration example of the load element 30 includes the voltage controller 33 and a connector 34 for load connection in addition to the above-described second connector 31.

The voltage controller 33 included in the load element 30b controls the power inputted from the second connector 31 to be a predetermined voltage and outputs the result to the connector 34 for load connection. In greater detail, the voltage controller 33 steps down or steps up the power inputted from the second connector 31 to a predetermined voltage such as the rated voltage according to the standards for the connector 34 for load connection and outputs the result to the connector 34 for load connection.

The connector 34 for load connection is a connector capable of mechanically and electrically connecting to an external load 35. The connector 34 for load connection may be mechanically and electrically attachable to and detachable from the external load 35. The connector 34 for load connection is not restricted and may be a connector conforming to a predetermined standard, such as a connector using a USB interface.

Apart from including a connector 36, the external load 35 has a similar configuration to that of the load 32 included in the above-described load element 30a. The connector 36 is a connector capable of mechanically and electrically connecting to the connector 34 for load connection. Like the connector 34 for load connection, the connector 36 is not restricted and may be a connector conforming to a predetermined standard, such as a connector using a USB interface. It suffices for the external load 35 to be capable of connecting, via the connector 36, to the connector 34 for load connection. The external load 35 may be a typical electronic device, such as a smartphone, a mobile phone, or a personal computer.

Figure 4:
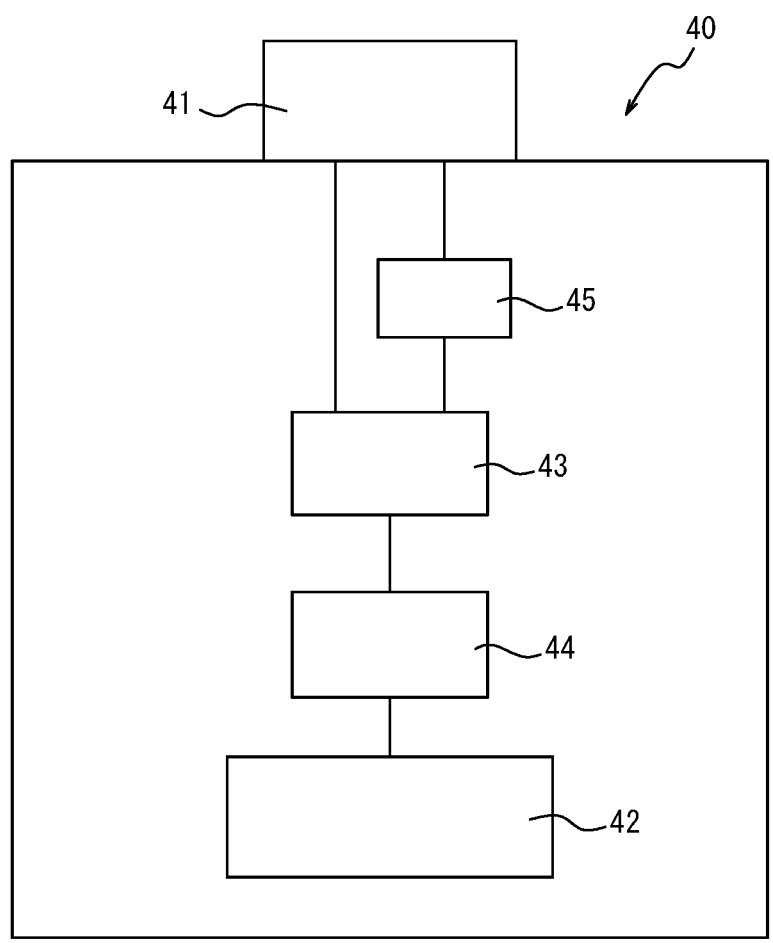
FIG. 4 is a schematic view of a configuration example of a secondary battery element as a circuit element included in the power wiring network apparatus illustrated in FIG. 1.

The power wiring network apparatus 1 may further include a secondary battery element 40 as a circuit element. FIG. 4 is a schematic view of a configuration example of the secondary battery element 40 as a circuit element included in the power wiring network apparatus 1.

As illustrated in FIG. 4, the secondary battery element 40 includes a second connector 41. Like the second connector 21 included in the energy harvesting element 20 and the second connector 31 included in the load element 30 illustrated in FIG. 1 and the like, the second connector 41 is mechanically and electrically attachable to and detachable from any of the first connectors 12 included in the wiring member 10. The power wiring network apparatus 1 may include a plurality of secondary battery elements 40. When a plurality of secondary battery elements 40 is included, the input electric power during charging and the output electric power during power supply may differ between the secondary battery elements 40.

As illustrated in FIG. 4, the secondary battery element 40 includes a secondary battery 42, a switch 43, a voltage controller 44, and a reverse current prevention unit 45 in addition to the above-described second connector 41.

The secondary battery 42 is capable of being charged and discharged. Examples of the secondary battery 42 include a lithium ion battery and a nickel-hydrogen battery.

The switch 43 is capable of switching between a charging state of charging the secondary battery 42 with power inputted from the second connector 41 and a power supply state of outputting, from the second connector 41, power from the secondary battery 42. The switch 43 includes a switching element, for example, electrically connected between the second connector 41 and the secondary battery 42.

The voltage controller 44 controls the power inputted from the second connector 41 to be a predetermined voltage and outputs the result to the secondary battery 42. In greater detail, the voltage controller 44 steps down or steps up the power inputted from the second connector 41 to a predetermined voltage suitable for charging the secondary battery 42, such as the rated voltage of the secondary battery 42, and outputs the result to the secondary battery 42. The voltage controller 44 also controls the power inputted from the secondary battery 42 to be a predetermined voltage and outputs the result to the second connector 41. In greater detail, the voltage controller 44 steps down or steps up the power inputted from the secondary battery 42 to a predetermined voltage suitable for another circuit element, such as a load element 30, and outputs the result to the second connector 41. The voltage controller 44 is connected between the switch 43 and the secondary battery 42 and is electrically connected to both.

When the switch 43 is in the power supply state, the reverse current prevention unit 45 suppresses current from the second connector 41 from flowing into the secondary battery 42. The reverse current prevention unit 45 can include a circuit element such as a diode. When a diode is used as the reverse current prevention unit 45, the diode is connected so that the anode is on the secondary battery 42 side, and the cathode is on the second connector 41 side. The reverse current prevention unit 45 is positioned on the wiring so as to be conductive when the switch 43 is in the power supply state and not to be conductive when the switch is in the charging state.

When the power wiring network apparatus 1 includes a secondary battery element 40 in this way, power can be supplied to the load element 30 stably by switching between the charging state and the power supply state of the secondary battery element 40 depending on conditions. For example, the secondary battery element 40 may be placed in the power supply state when power supply to the load element 30 is insufficient and be placed in the charging state when power supply to the load element 30 is sufficient.

Second Embodiment

Figure 5:
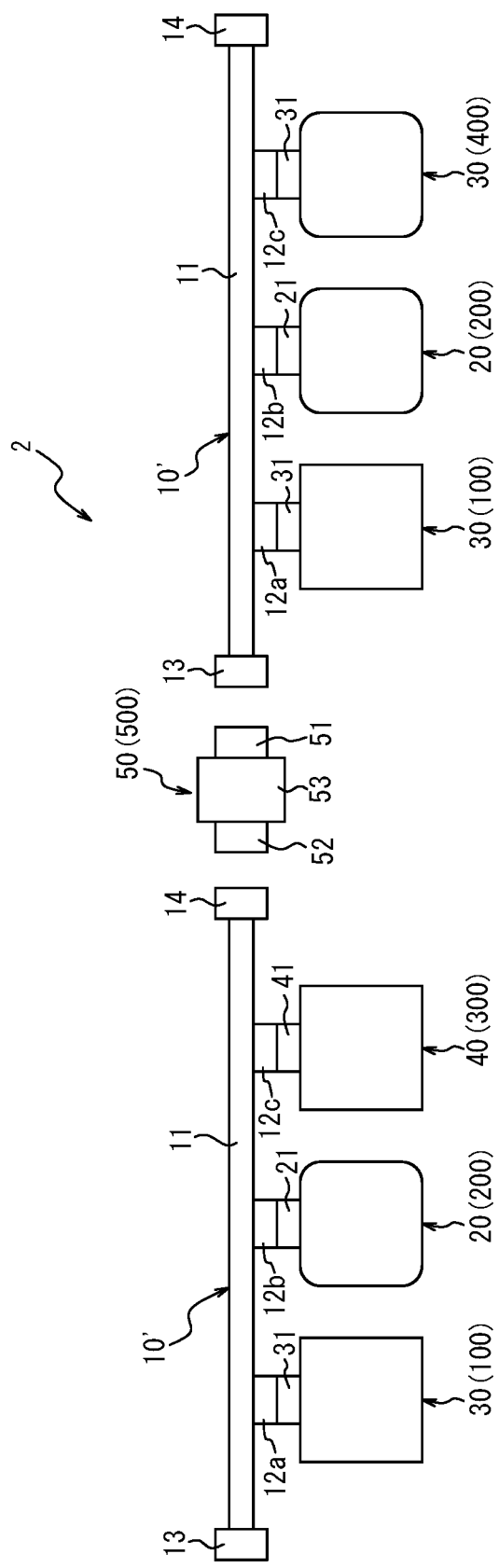
FIG. 5 is a schematic view of a power wiring network apparatus according to a second embodiment of the present disclosure.

FIG. 5 illustrates the configuration of a power wiring network apparatus 2 according to a second embodiment of the present disclosure. Here, the detailed configuration of the physical layer and the configuration of the logical layer are described with reference to the configuration of the power wiring network apparatus 2 according to the second embodiment. The power wiring network apparatus 2 includes two wiring members 10'. Each wiring member 10' further includes a third connector 13 and a fourth connector 14 in addition to the first connectors 12a, 12b, 12c. The third connector 13 is provided at one end of the wiring member 10' (the left end in FIG. 5). The fourth connector 14 is provided at the other end of the wiring member 10' (the right end in FIG. 5). The fourth connector 14 is mechanically and electrically attachable to and detachable from the third connector 13. In the wiring member 10', all of the first connectors 12, the third connector 13, and the fourth connector 14 are electrically connected to each other by the conductive portion 11. In the present embodiment, a power line capable of supplying power from the energy harvesting element 20 to the load element 30 is formed by the conductive portion 11, the first connectors 12a, 12b, 12c, the third connector 13, and the fourth connector 14. The power line can, for example, be a two-wire system.

One load element 30 is connected to the first connector 12a, one energy harvesting element 20 to the first connector 12b, and one secondary battery element 40 to the first connector 12c of one wiring member 10' (the left one in FIG. 5). One load element 30 is connected to the first connector 12a, one energy harvesting element 20 to the first connector 12b, and one load element 30 to the first connector 12c of the other wiring member 10' (the right one in FIG. 5).

The use of two wiring members 10', as in the present embodiment, can achieve a longer wiring member than a single wiring member 10' and enables an increase in the overall number of first connectors 12 to which circuit elements can be attached. The degree of freedom of arrangement can thereby be increased.

In the present embodiment, the two wiring members 10' are configured to be connectable by a switching element 50.

The switching element 50 includes a fifth connector 51, a sixth connector 52, and a switch 53. The fifth connector 51 is mechanically and electrically attachable to and detachable from the third connector 13 included in the wiring member 10'. The sixth connector 52 is mechanically and electrically attachable to and detachable from the fourth connector 14 included in the wiring member 10'. The fifth connector 51 and the sixth connector 52 in the present embodiment are provided at the left and right ends of the switching element 50 in FIG. 5. The two wiring members 10' are basically arranged to be collinear by the third connector 13 of the wiring member 10' being connected to the fifth connector 51 and the fourth connector 14 of the wiring member 10' being connected to the sixth connector 52. When a plurality of wiring members 10' are connected by the switching element 50 in this way, the plurality of wiring members 10' can be handled outwardly as though they formed a single wiring member 10'.

The switch 53 can switch the fifth connector 51 and the sixth connector 52 between being electrically connected and disconnected. The switch 53 includes a switching element, for example, electrically connected between the fifth connector 51 and the sixth connector 52. The switch 53 may, for example, be configured so that between the fifth connector 51 and the sixth connector 52, an electrical connection for supplying DC power is switched between a connected and disconnected state, whereas an electrical connection for signal transmission by AC power (i.e. a C-connection or the like) is continuously maintained.

When at least two wiring members 10' are mechanically connected via the switching element 50 as in the present embodiment, the plurality of wiring members 10' can be switched between being electrically connected to and disconnected from each other by switching of the switch 53 in the switching element 50. Accordingly, when power is to be supplied preferentially to the load element 30 connected to the wiring member 10' on the right side of FIG. 5, for example, the switch 53 can be disconnected when the power supply of the energy harvesting element 20 connected to the wiring member 10' on the right side is sufficient. Power is then supplied to the load element 30 from the energy harvesting element 20 connected to the wiring member 10' on the right side. When the power supply of the energy harvesting element 20 connected to the wiring member 10' on the right side is insufficient, the switch 53 can be connected. Power can then be supplied to the load element 30 connected to the wiring member 10' on the right side from the energy harvesting element 20 and the secondary battery element 40 connected to the wiring member 10' on the left side. In accordance with the generated power of the energy harvesting element 20, power can thus be supplied on a priority basis to the load element 30 with a high priority for power supply. By the switch 53 being disconnected, the energy harvesting element 20 and the load element 30 can be arranged for each wiring member 10'. A plurality of independent systems can be configured with any number of energy harvesting elements 20 and any number of load elements 30 combined in each system.

Next, power line communication for data communication via the power line formed by the conductive portion 11 and the first connector 12 of the wiring member 10' is described. In the example of FIG. 5, the load element 30 connected to the first connector 12a of the wiring members 10' on the left and right is a circuit element for network management of the power wiring network apparatus 2. This circuit element includes a controller 101 configured by a central processing unit (CPU) or the like and functions as a network management device 100 configured as a load element 30 that receives power supplied from the power line.

Figure 6:
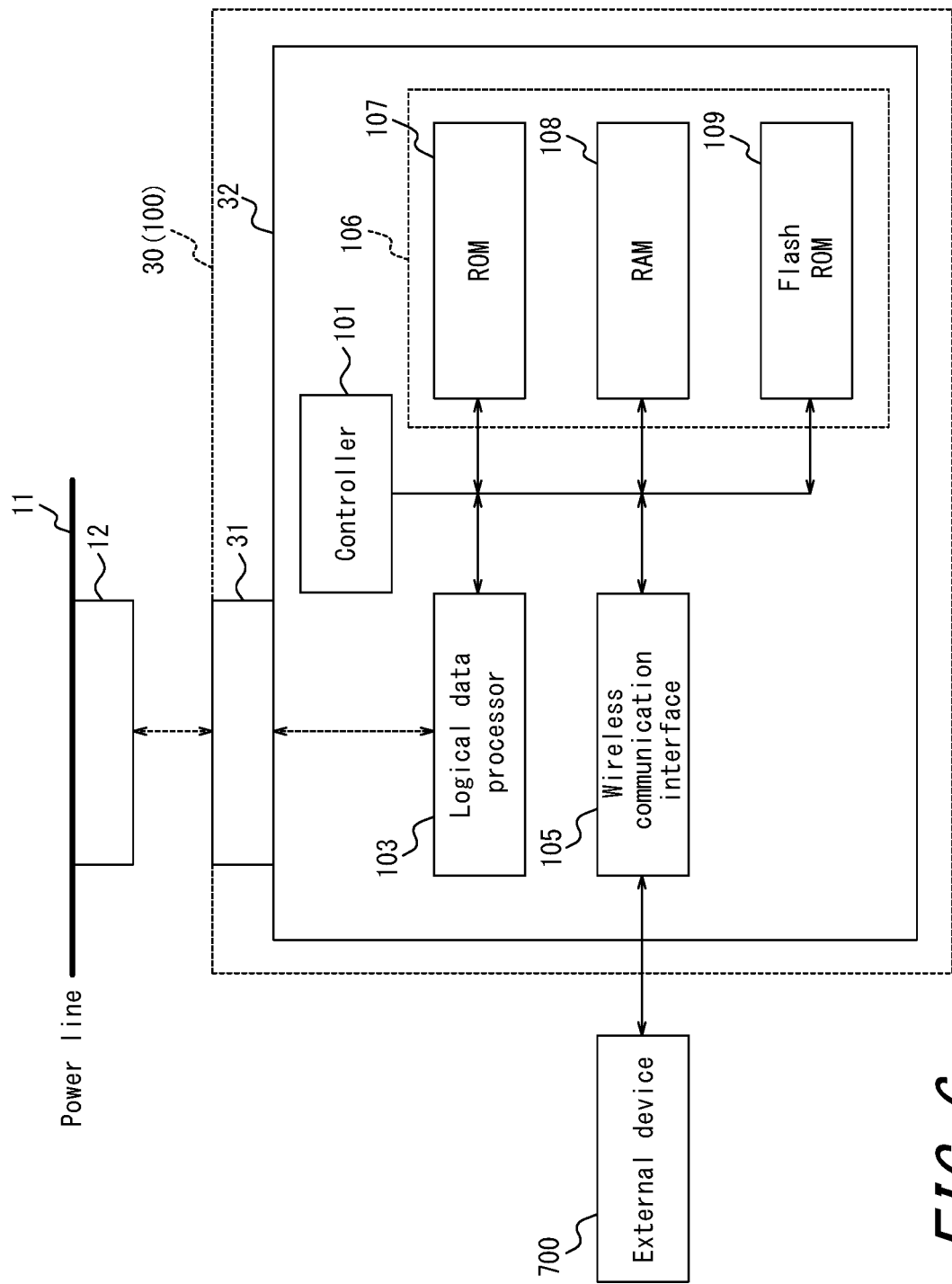
FIG. 6 is a schematic view of a configuration example of a network management device as a load element included in the power wiring network apparatus illustrated in FIG. 5.

FIG. 6 is a block diagram illustrating the configuration of the network management device 100 as a load element 30. The network management device 100 includes a controller 101 that controls the device overall, a logical data processor 103 that processes data transmitted and received to and from the power line, a wireless communication interface 105 for communicating with an external device 700 wirelessly, such as by Bluetooth or Wi-Fi® (Wi-Fi is a registered trademark in Japan, other countries, or both), and a storage 106 that includes a read-only memory (ROM) 107, a random access memory (RAM) 108, and a rewritable flash ROM 109. The controller 101, the logical data processor 103, the wireless communication interface 105, and the storage 106 operate by receiving power supplied from the voltage controller 33 (see FIG. 3A), not illustrated in FIG. 6. In other words, the controller 101, the logical data processor 103, the wireless communication interface 105, and the storage 106 constitute the load 32 in FIG. 3A.

The controller 101 controls the logical data processor 103, the wireless communication interface 105, the storage 106, and the like, as described below. The controller 101 can be configured by one or more CPUs, application specific integrated circuits (ASICs), digital signal processors (DSPs), programmable logic devices (PLDs), field programmable gate arrays (FPGAs), microcontrollers, or the like.

The logical data processor 103 executes processing such as transmission and reception of data via the power line and generation of synchronization signals S1 to S4 for transmission and reception of data. The configuration of the logical data processor 103 is described in further detail below.

Figure 7:
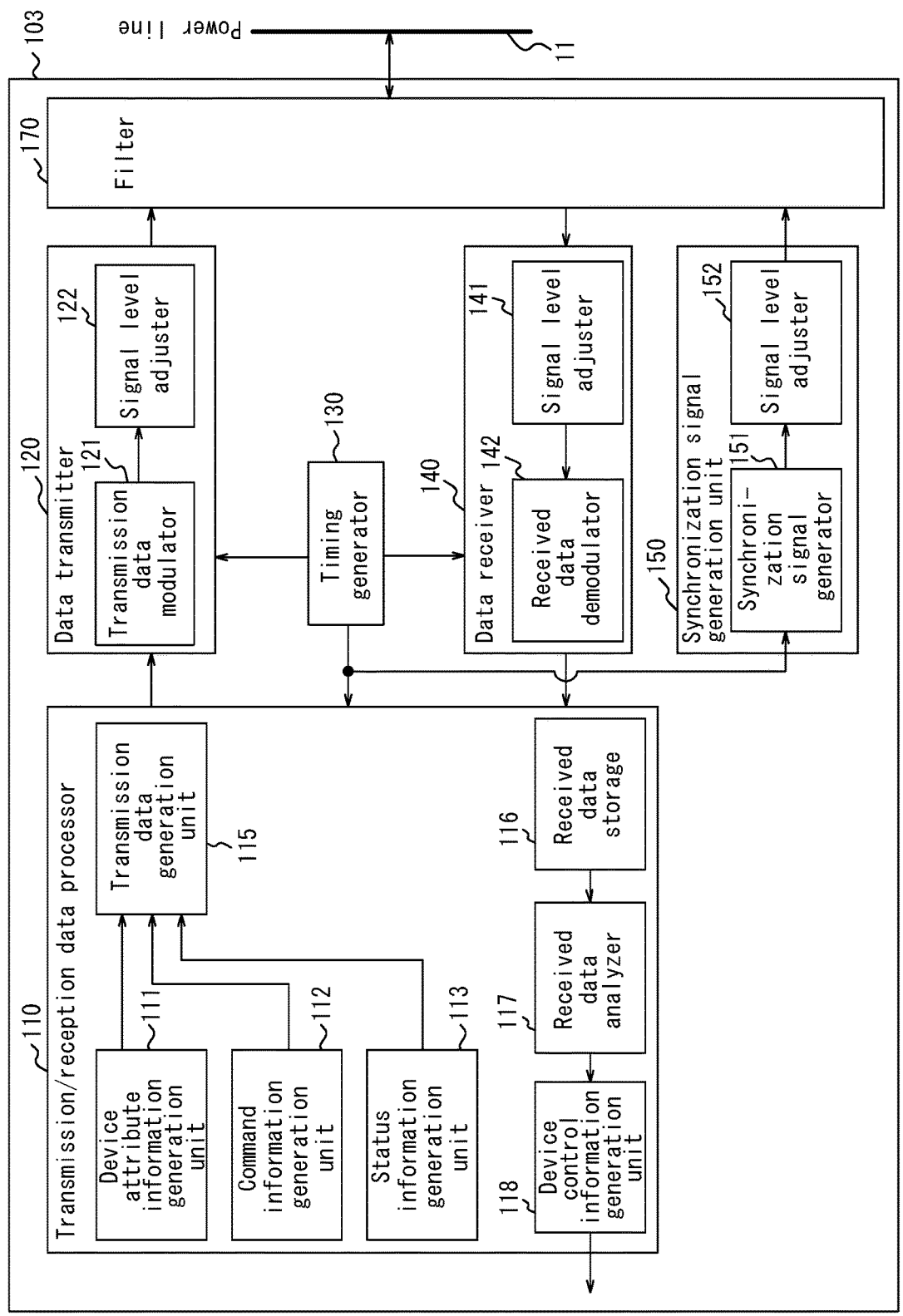
FIG. 7 is a schematic view of a configuration example of a logical data processor included in the network management device illustrated in FIG. 6.

FIG. 7 is a block diagram illustrating the configuration of the logical data processor 103. The logical data processor 103 includes a filter 170 for removing the DC component from electric power that includes a data signal supplied via the power line, a data receiver 140 for receiving and demodulating the data signal from which the DC component was removed to generate received data, a data transmitter 120 for modulating transmission data to generate a data signal to superimpose on the power line, a transmission/reception data processor 110 for performing signal processing on the received data and for generating transmission data, a timing generator 130 for generating a timing signal and the like for generation of the synchronization signals S1 to S4, and a synchronization signal generation unit 150 for generating the synchronization signals S1 to S4 that determine the transmission timing of transmission data and the like.

The filter 170 has the function of removing the DC component from electric power that includes a data signal supplied via the power line. The filter 170 can, for example, be configured as a "C-connection" that connects the power line with the data receiver 140 and the data transmitter 190 using a capacitor. In addition to being configured in this way as a high pass filter using a passive element, the filter 170 may be configured as a bandpass filter that only transmits signals in a particular band or be configured to include an active element such as an operational amplifier or a transistor.

The data receiver 140 receives and demodulates the data signal from which the DC component was removed, thereby generating received data. The data receiver 140 includes a signal level adjuster 141 for adjusting the signal level and a received data demodulator 142 for demodulating the signal, after level adjustment, to generate the received data.

The signal level adjuster 141 adjusts the signal amplitude so that the signal level of the data signal, from the power line, filtered by the filter 170 to include only the AC component falls within a predetermined range. The signal level adjuster 141 can be implemented by an automatic gain control circuit capable of adjusting the gain to be within a range suitable for the input signal level by feeding back the maximum signal level, for example. The received data demodulator 142 reads the level-adjusted data signal based on a timing signal from the timing generator 130 and demodulates the data signal that was modulated by another circuit element back to the original signal. The data signal may be demodulated by dedicated hardware or by software processing by the controller 101 or the like.

The data transmitter 120 modulates the transmission data generated by the transmission/reception data processor 110 and superimposes the modulated transmission data on the power line via the filter 170. The data transmitter 120 includes a transmission data modulator 121 for modulating transmission data using a predetermined modulation method and a signal level adjuster 122 for adjusting the signal level.

The transmission data modulator 121 digitally modulates the transmission data, generated by the transmission/reception data processor 110, using a predetermined modulation method. Orthogonal frequency division multiplexing (OFDM), spread spectrum (SS), or the like can be used as the modulation format, although these examples are not limiting. The transmission data modulator 121 outputs the modulated transmission data at an appropriate timing based on the timing signal from the timing generator 130 to input the modulated transmission data to the signal level adjuster 122. The signal level adjuster 122 adjusts the signal amplitude of the transmission data, modulated by the transmission data modulator 121, so that the signal level is suitable for superimposition on the power line.

The transmission/reception data processor 110 processes the received data received by the data receiver 140 and generates the transmission data that serves as the basis for the data signal to be superimposed on the power line by the data transmitter 120. The transmission/reception data processor 110 includes a received data storage 116, a received data analyzer 117, and a device control information generation unit 118 as functional components for processing the received data. The transmission/reception data processor 110 includes a device attribute information generation unit 111, a command information generation unit 112, a status information generation unit 113, and a transmission data generation unit 115 as functional components for processing the transmission data.

The received data demodulated by the data receiver 140 is stored in the received data storage 116 as necessary. The received data storage 116 may be configured as a dedicated storage for received data or as a partial area inside the RAM 108 of the storage 106, for example.

The data stored in the received data storage 116 is analyzed by the received data analyzer 117. The received data is analyzed by determining whether the received data is attribute information, command information, or status information from another circuit element. When the received data is attribute information, the received data is analyzed by identifying the device that transmitted the attribute information, parameters of the attribute information, and the like. When the received data is command information, the received data is analyzed by identifying the device that transmitted the command information, the type of command ("command code" in Table 2), parameters, and the like. When the received data is status information, the received data is analyzed by identifying the device that transmitted the status information, the type of status ("status code" in Table 3), parameters, and the like. The received data may be analyzed by dedicated hardware or by software processing by the controller 101 or the like.

The result of analysis of the received data by the received data analyzer 117 is processed by the device control information generation unit 118. For example, when the result of analysis of the received data is status information of a radio device 400, described below, the device control information generation unit 118 transmits the status information of the radio device 400 to the external device 700, such as a smartphone, via Bluetooth communication by the wireless communication interface 105. Consequently, by receiving the status information from the radio device 400, the user of the external device 700 can confirm whether operations by the user have been reflected in the state of the radio device 400.

The transmission/reception data processor 110 includes the device attribute information generation unit 111, the command information generation unit 112, the status information generation unit 113, and the transmission data generation unit 115 as functional components for processing the transmission data. The below-described transmission data processing may be implemented by hardware or by software processing by the controller 101 or the like.

The device attribute information generation unit 111 is a functional component for generating device attribute information in the format of the transmission data. The device attribute information is the device manufacturer, the device type, a device identifier, device characteristics, and the like. The device attribute information can, for example, be generated by reading related information from the ROM 107 and converting the related information to the format of the transmission data as necessary.

The command information generation unit 112 is a functional component for generating command information in the format of the transmission data. The command information includes information with a recipient device number, a command code, a command parameter, and the like. The command information generation unit 112 receives a command issued in response to user operation on an application executed by the external device 700, such as a smartphone. The command information generation unit 112 receives the command by Bluetooth communication and generates a power line communication command corresponding to the received command. For example, when the user performs an operation on the external device 700 to raise the volume of the radio, the command information generation unit 112 can generate a command to raise the volume of the radio for the radio device 400 (connected to the first connector 12c of the wiring member 10' at the right side in FIG. 5) corresponding to the command, received by Bluetooth communication, to raise the volume of the radio. The radio device 400 is one of the load elements 30 managed by the network management device 100.

The status information generation unit 113 is a functional component for generating status information in the format of the transmission data. The status information includes information with a transmission device number, a status code, a status parameter, and the like. The status information generation unit 113 generates status information indicating that, for example, the network management device 100 has successfully received the attribute data of another circuit element (energy harvesting element 20, load element 30, or the like).

Based on a timing signal from the timing generator 130, described below, the transmission data generation unit 115 outputs the transmission data, generated by each of the device attribute information generation unit 111, the command information generation unit 112, and the status information generation unit 113, in an appropriate order and at an appropriate timing to input the transmission data to the data transmitter 120.

The synchronization signal generation unit 150 includes a synchronization signal generator 151 for generating the synchronization signals S1 to S4 based on the timing signal from the timing generator 130 and a signal level adjuster 152 for adjusting the signal amplitude so that the signal level of the synchronization signals S1 to S4 outputted from the synchronization signal generator 151 is suitable for superimposition on the power line.

Figure 8:
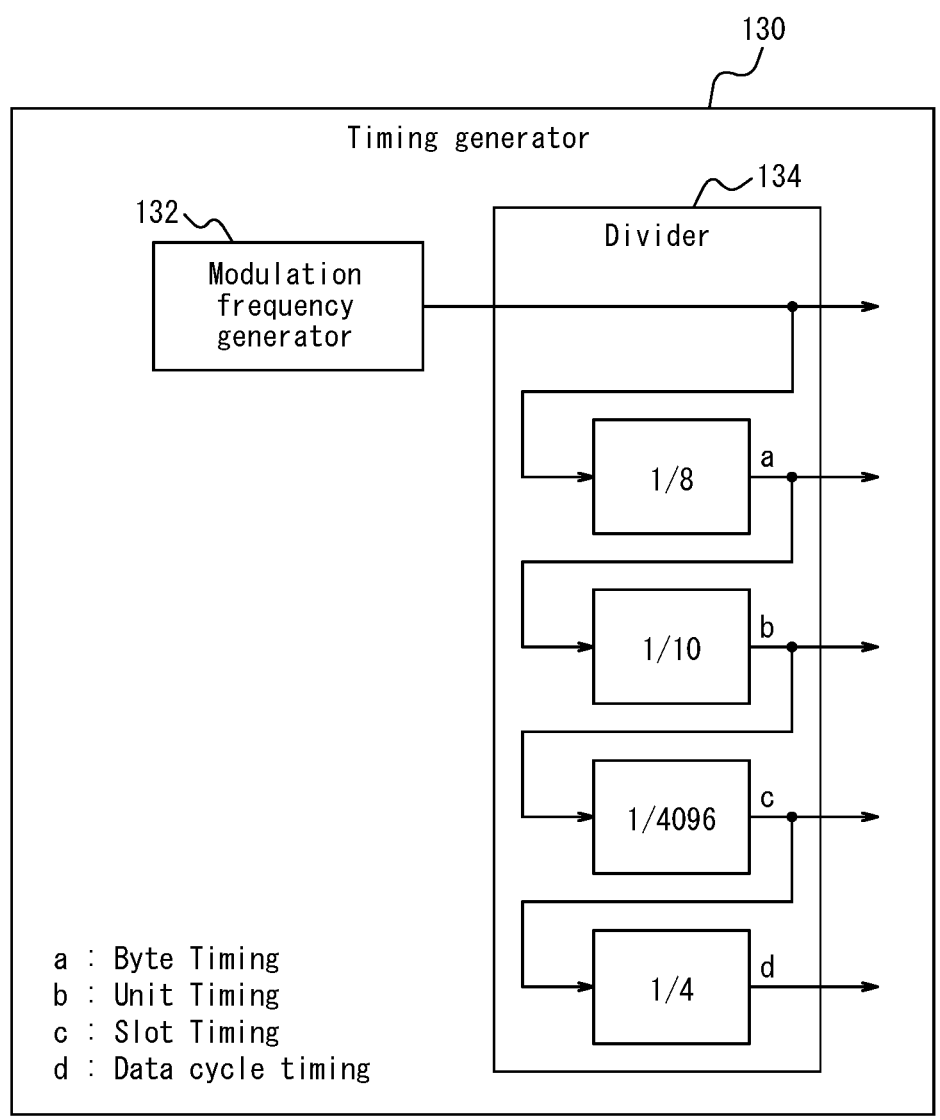
FIG. 8 is a schematic view of a configuration example of a timing generator included in the logical data processor illustrated in FIG. 7.

FIG. 8 is a block diagram illustrating the configuration of the timing generator 130. The timing generator 130 includes a modulation frequency generator 132 for generating a modulated wave modulated at a predetermined frequency and a frequency divider 134 for dividing the modulated wave from the modulation frequency generator 132 at a predetermined dividing ratio to obtain various timing signals.

In the present embodiment, the cycle of the modulated wave outputted by the modulation frequency generator 132 corresponds to a period of one bit. Accordingly, one cycle of a timing signal a obtained by dividing the modulated wave from the modulation frequency generator 132 by eight corresponds to the period of one byte. One cycle of a timing signal b obtained by dividing the timing signal a by 10 corresponds to the period of one unit configured to have a length of 10 bytes, as described below. One cycle of a timing signal c obtained by further dividing the timing signal b by 4096 corresponds to the period of one slot configured to have a length of 4096 units, as described below. One cycle of a timing signal d obtained by further dividing the timing signal c by four corresponds to the period of one data cycle configured to have a length of four slots, as described below. The frequency of the modulated wave outputted by the modulation frequency generator 132 can, for example, be 100 kHz (the period of one bit thus becoming 0.01 msec), but this configuration is not limiting. The synchronization signal generator 151 illustrated in FIG. 7 generates pulses (synchronization signals S1 to S4), with a length of one unit, that rise synchronously with the slot timing signal (timing signal c) outputted by the timing generator 130.

The modulated wave outputted by the modulation frequency generator 132 may be generated by dedicated hardware or be generated from a reference clock such as the CPU constituting the controller 101.

The wireless communication interface 105 has the function of performing wireless communication conforming to a wireless communication standard such as Bluetooth or Wi-Fi. The wireless communication interface 105 communicates with the external device 700, such as a smartphone or tablet PC, and transmits a power line communication command, corresponding to a command received from the external device 700, to another device managed by the network management device 100. The wireless communication interface 105 can also transmit status information received from the other device to the external device 700.

The storage 106 includes the ROM 107, the RAM 108, the rewritable, programmable flash ROM 109, and the like. The ROM 107 and the flash ROM 109 are both read-only memories, but the flash ROM 109 is writable and can store information such as programs to be executed by the CPU. The RAM 108 is a backup memory and is configured by dynamic random access memory (DRAM) or the like. The RAM 108 may include a volatile memory or non-volatile memory other than DRAM. The network management device 100 may be configured to include only a portion of the storage 106 illustrated in FIG. 6 or not to include the storage 106.

Figure 9:
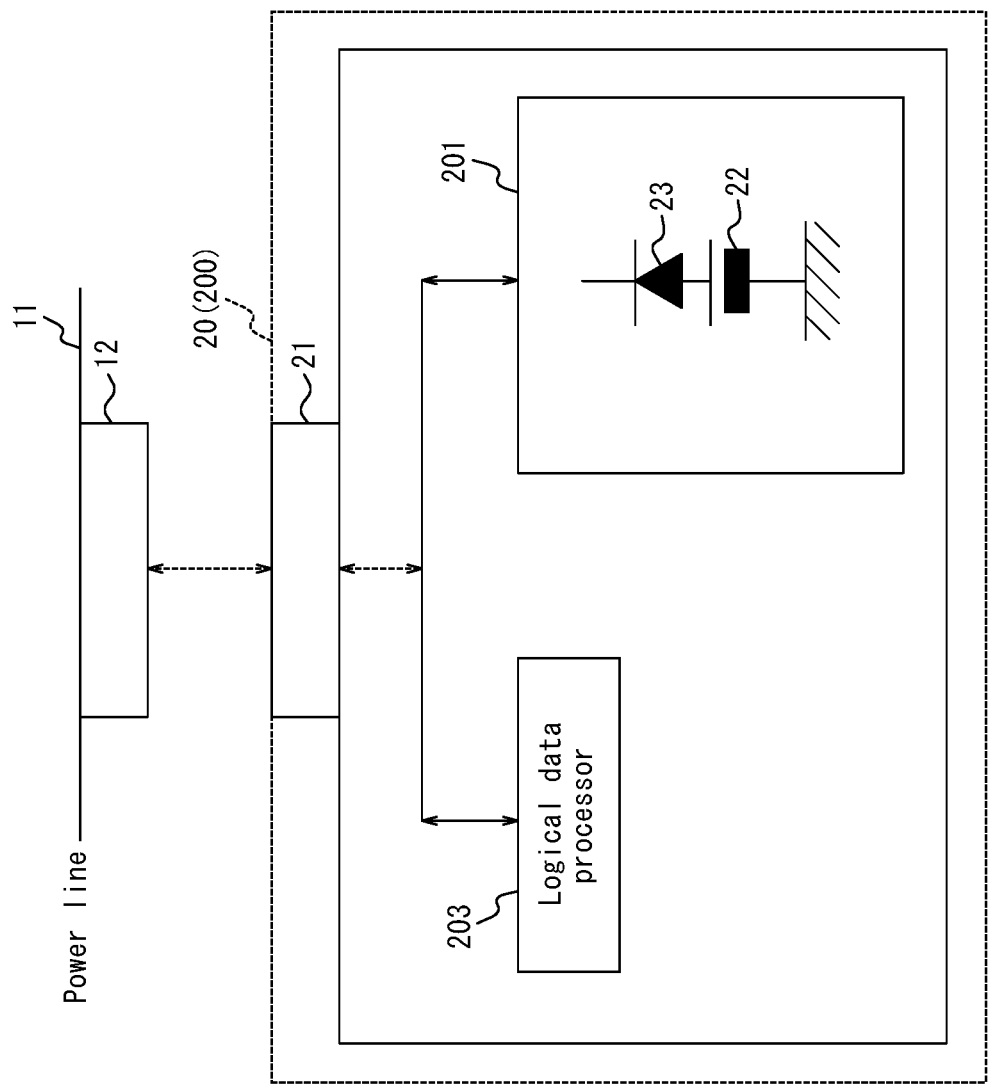
FIG. 9 is a schematic view of a configuration example of an energy harvesting device as an energy harvesting element included in the power wiring network apparatus illustrated in FIG. 5.

FIG. 9 is a block diagram illustrating the configuration of an energy harvesting device 200 as the energy harvesting element 20. The energy harvesting device 200 includes a power generator 201, which includes the energy harvesting unit 22, and a logical data processor 203 that processes data transmitted to and received from the power line.

The power generator 201 includes a solar cell as the energy harvesting unit 22 and a reverse current prevention unit 23 that suppresses current from the second connector 21 from flowing into the energy harvesting unit 22. The reverse current prevention unit 23 in the present embodiment is configured as a diode connected so that the cathode is on the second connector 21 side.

Figure 10:
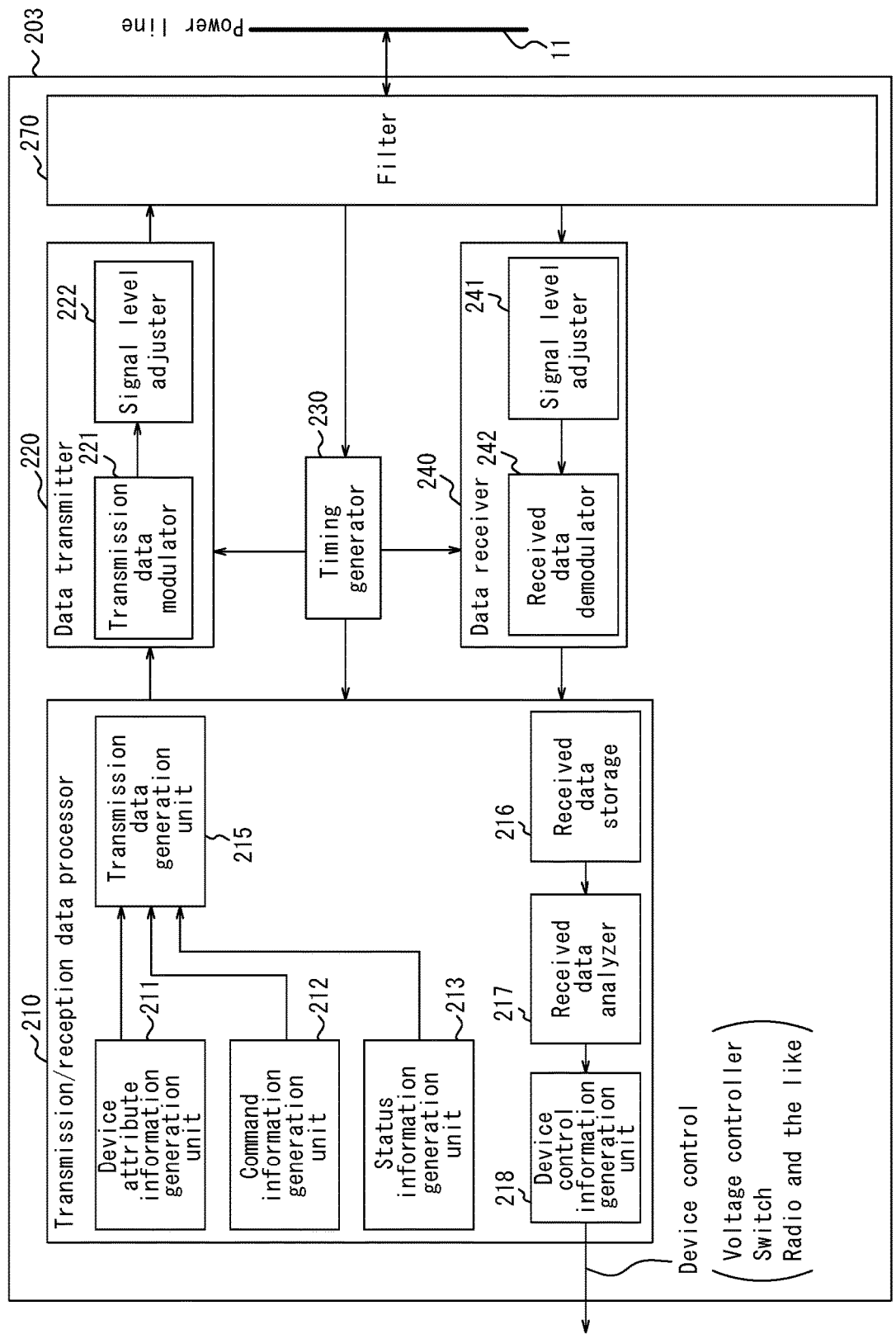
FIG. 10 is a schematic view of a configuration example of a logical data processor included in the energy harvesting device illustrated in FIG. 9.

The logical data processor 203 executes processing such as transmission and reception of data via the power line. FIG. 10 illustrates the configuration of the logical data processor 203. The logical data processor 203 has a configuration close to that of the logical data processor 103 illustrated in FIG. 7, except that the configuration of a timing generator 230 differs, and the synchronization signal generation unit 150 is omitted.

Figure 11:
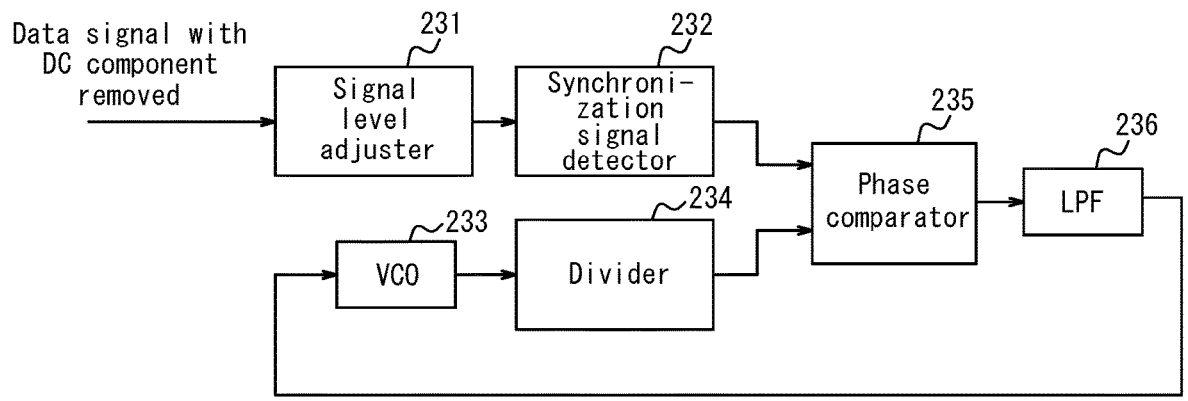
FIG. 11 is a schematic view of a configuration example of a timing generator included in the logical data processor illustrated in FIG. 10.
Figure 11:
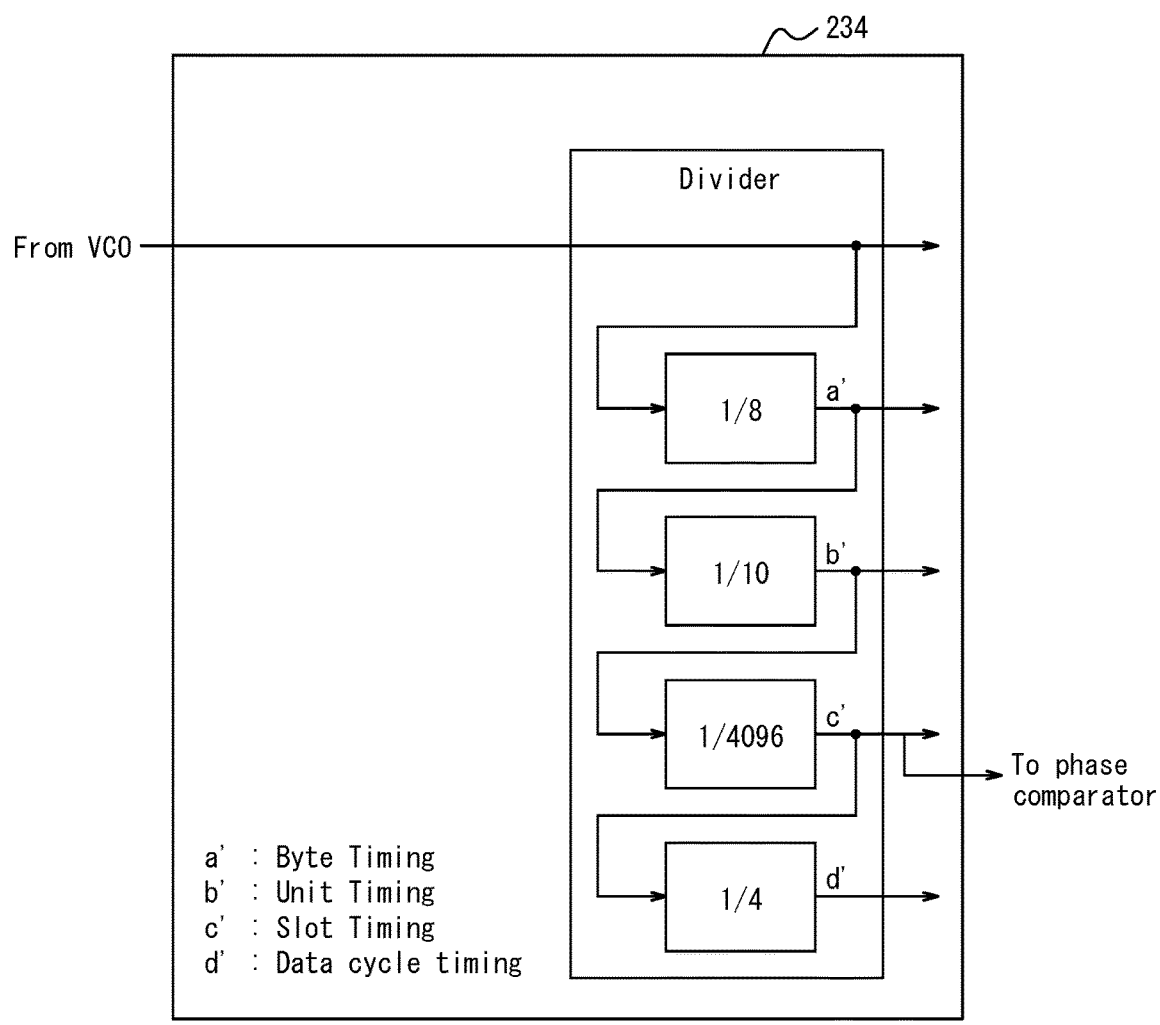

The logical data processor 203 includes the timing generator 230 that has a configuration partially differing from that of the timing generator 130 illustrated in FIG. 7. The configuration of the timing generator 230 is illustrated in FIG. 11.

The timing generator 230 includes a signal level adjuster 231 for adjusting the signal level of the data signal, received from the power line via the filter 270, from which the DC component was removed, a synchronization signal detector 232 for detecting the synchronization signals S1 to S4 from the level-adjusted data signal, a voltage-controlled oscillator (VCO) 233, a divider 234, a phase comparator 235, and a low pass filter (LPF) 236. This configuration can be used to form a phase locked loop (PLL) circuit that takes the synchronization signals S1 to S4 on the data signal as input reference signals. In other words, a phase comparison between the synchronization signals S1 to S4, on the data signal, that become input reference signals and the obtained timing signal makes it possible to obtain a timing signal synchronized with the synchronization signals S1 to S4 on the data signal and timing signals a' to d' yielded by dividing by a predetermined dividing ratio. At this time, one cycle of the timing signal a' obtained by division by eight corresponds to the period of one byte. One cycle of a timing signal b' obtained by dividing the timing signal a' by 10 corresponds to the period of one unit configured to have a length of 10 bytes, as described below. One cycle of a timing signal c' obtained by further dividing the timing signal b' by 4096 corresponds to the period of one slot configured to have a length of 4096 units, as described below. One cycle of a timing signal d' obtained by further dividing the timing signal c' by four corresponds to the period of one data cycle configured to have a length of four slots, as described below.

A transmission/reception data processor 210 inside the logical data processor 203 may, for example, be configured to generate status information, in a status information generation unit 213, consisting of the generated power in the energy harvesting unit 22 and transmit the status information as transmission data to another device. In this way, another circuit element can effectively use the generated power from the energy harvesting element 20.

In a secondary battery device 300 as the secondary battery element 40 capable of supplying power to the load element 30, the power generator 201 in FIG. 9 is replaced by a battery unit 301 that includes the reverse current prevention unit 45, the switch 43, the voltage controller 44, and the secondary battery 42. A device control information generation unit 218 of the logical data processor 203 mounted in the secondary battery device 300 controls the switch 43 to switch the secondary battery 42 between a charging state and a discharging state. The device control information generation unit 218 may perform operations such as control of the voltage controller 44. The transmission/reception data processor 210 inside the logical data processor 203 may, for example, be configured to generate status information, in the status information generation unit 213, consisting of the stored electricity in the secondary battery 42 and transmit the status information as transmission data to another device. In this way, another circuit element can effectively use the electricity stored in the secondary battery 42.

In a radio device 400 as the load element 30, the power generator 201 in FIG. 9 is replaced by a radio 401. The device control information generation unit 218 of the logical data processor 203 mounted in the radio device 400 controls the radio 401 to change stations and adjust the volume.

Figure 12:
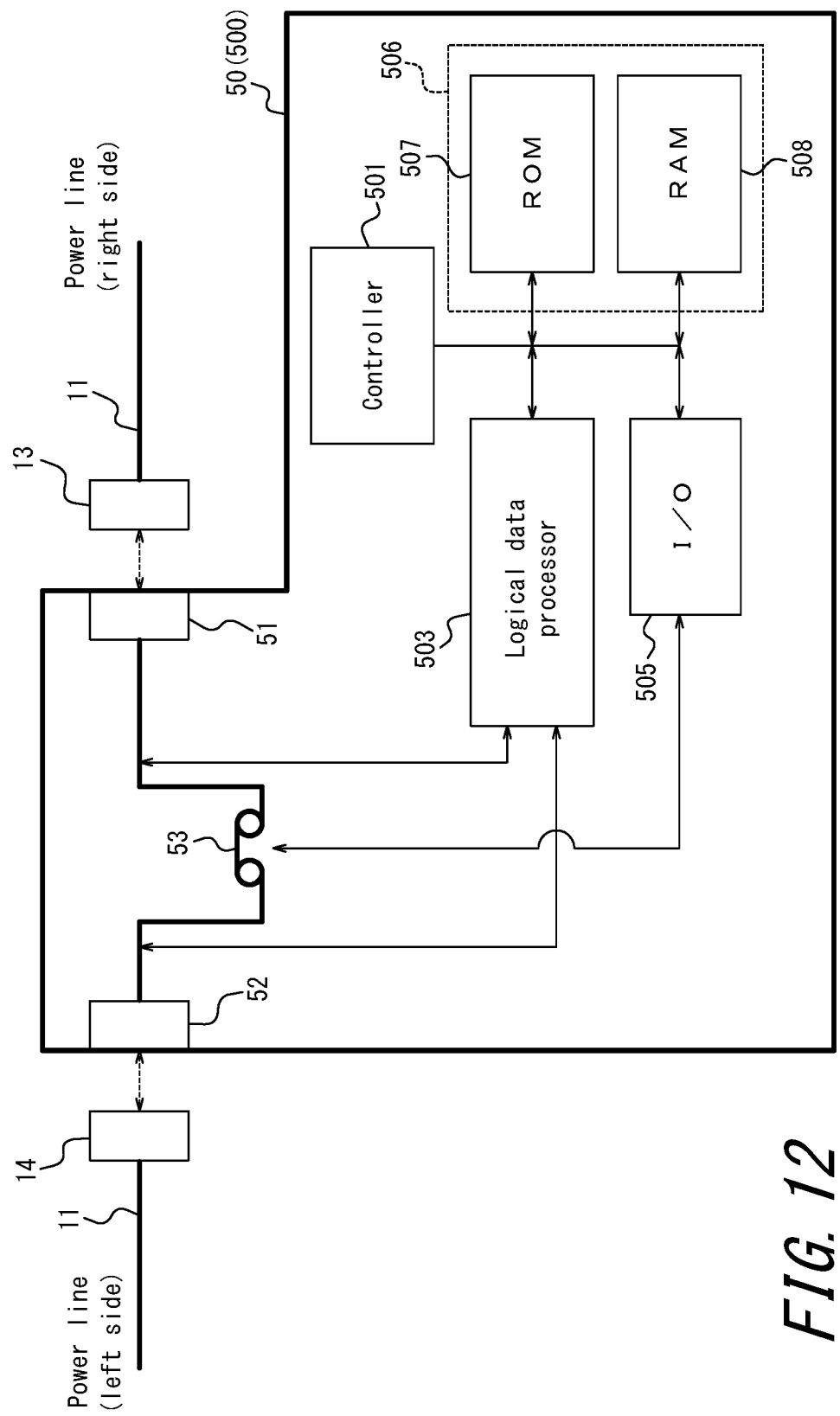
FIG. 12 is a schematic view of a configuration example of an interrupting/conducting device as a switching element included in the power wiring network apparatus illustrated in FIG. 5.

Next, the configuration of an interrupting/conducting device 500 as the switching element 50 is described. FIG. 12 is a block diagram illustrating the configuration of the interrupting/conducting device 500 as the switching element 50. The interrupting/conducting device 500 includes a controller 501 for controlling the device overall, a logical data processor 503 for processing data transmitted to and received from the power line, a storage 506 including a ROM 507, a RAM 508, and the like, a switch 53 for switching the connection of two power lines that pass through the interrupting/conducting device 500, an I/O processor 505 for supplying a switching signal to the switch 53, and the fifth connector 51 and sixth connector 52 that connect to the wiring member 10' (power line). The fifth connector 51 and the sixth connector 52 are electrically connectable inside the switching element 50 (interrupting/conducting device 500) via the switch 53. Only one conductive portion of the two-wire conductive portion connecting the fifth connector 51 and the sixth connector 52 is illustrated in FIG. 12. The controller 501, the logical data processor 503, and the storage 506 receive a supply of power from the power line to operate (the supply route from the power source is not illustrated). The interrupting/conducting device 500 may be configured to include only a portion of the storage 506 illustrated in FIG. 12 or not to include the storage 506.

The differences from the energy harvesting device 200 in the configuration of the interrupting/conducting device 500 are mainly described here.

The controller 501 controls the logical data processor 503, the storage 506, the I/O processor 505, and the like, as described below. In the example of FIG. 12, the controller 501 controls the switch 53 through control of the I/O processor 505, but the controller 501 may be configured to control the switch 53 directly. The controller 501 can be configured by one or more CPUs, application specific integrated circuits (ASICs), digital signal processors (DSPs), programmable logic devices (PLDs), field programmable gate arrays (FPGAs), microcontrollers, or the like.

Figure 13:
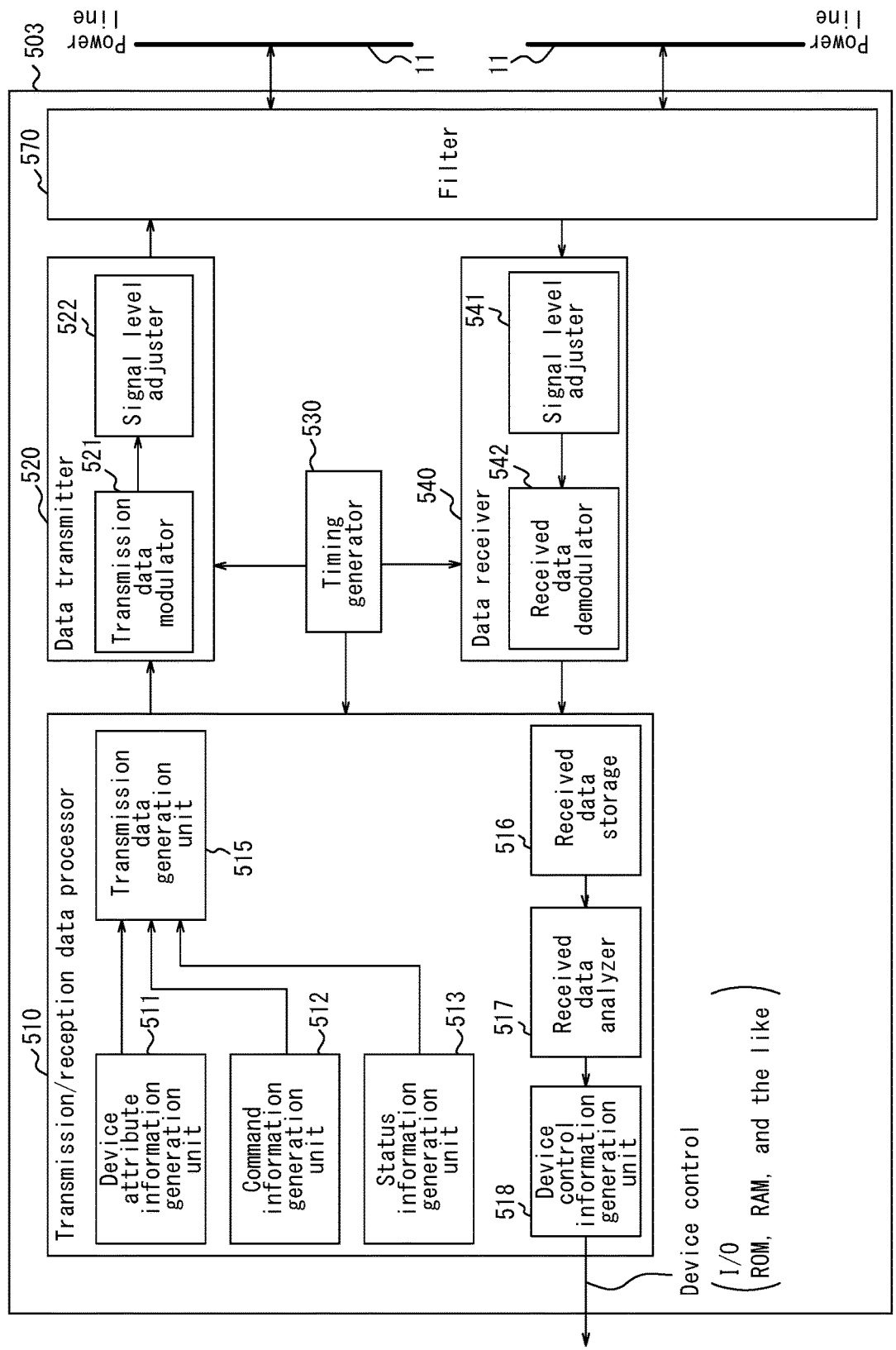
FIG. 13 is a schematic view of a configuration example of a logical data processor included in the interrupting/conducting device illustrated in FIG. 12.

The logical data processor 503 executes processing such as transmission and reception of data via the power line. As illustrated in FIG. 13, the logical data processor 503 has a configuration similar to that of the logical data processor 203 included in the energy harvesting device 200. The logical data processor 503 can exchange signal data with either or both of the wiring member 10' (power line) on the left side and the wiring member 10' (power line) on the right side of FIG. 5. In other words, when the wiring members 10' on the left or right are disconnected by switching of the switch 53, the logical data processor 503 exchanges signal data with either the wiring member 10' (power line) on the left side or the wiring member 10' (power line) on the right side of FIG. 5. A non-illustrated switching element controlled by the I/O processor 505, for example, can be used to switch the logical data processor 503 between exchanging signal data with the wiring member 10' on the left and on the right. The selection of whether the logical data processor 503 exchanges signal data with the wiring member 10' on the left or the right may, for example, be made by the user with an application program on the external device 700, or the switching may occur at fixed intervals. When the user makes the selection on the external device 700, a command is transmitted via the network management device 100 to the interrupting/conducting device 500. On the other hand, when the wiring members 10' on the left and right are connected by switching of the switch 53, the same signal data is superimposed on the wiring members 10' on the left and right. The logical data processor 503 therefore exchanges signal data with the wiring members 10' on the left and right. When DC power between the wiring members 10' on the left and right is interrupted by switching of the switch 53, an electrical connection for signal transmission by AC power may be maintained between the wiring members 10' on the left and right. In this case, the logical data processor 503 can exchange signal data with the wiring members 10' on the left and right.

The same data signal is superimposed on the wiring members 10' on the left and right when the wiring members 10' on the left and right in FIG. 5 are connected by the switch 53, or when the wiring members 10' on the left and right are continually AC coupled. In this case, the network management device 100 connected to the wiring member 10' on the left side and the network management device 100 connected to the wiring member 10' on the right side in FIG. 5 are controlled so that only one functions as a network management device, whereas the other does not.

The logical data processor 503 analyzes the received data from a data receiver 540 using a received data analyzer 517 and generates device control information in a device control information generation unit 518. The device control information is, for example, control information of the I/O processor 505, the ROM 507, the RAM 508, and the like. The device control information may be control information of the switching element for determining whether the logical data processor 503 exchanges signal data with the wiring member 10' on the left or the right.

The I/O processor 505 controls switching elements in the switch 53 and the like by switching an output voltage between high and low and judges the state and the like of various devices based on an input voltage. The I/O processor 505 can be configured by an input/output port of a microcomputer as the controller 501, for example, or by dedicated hardware.

Figure 14:
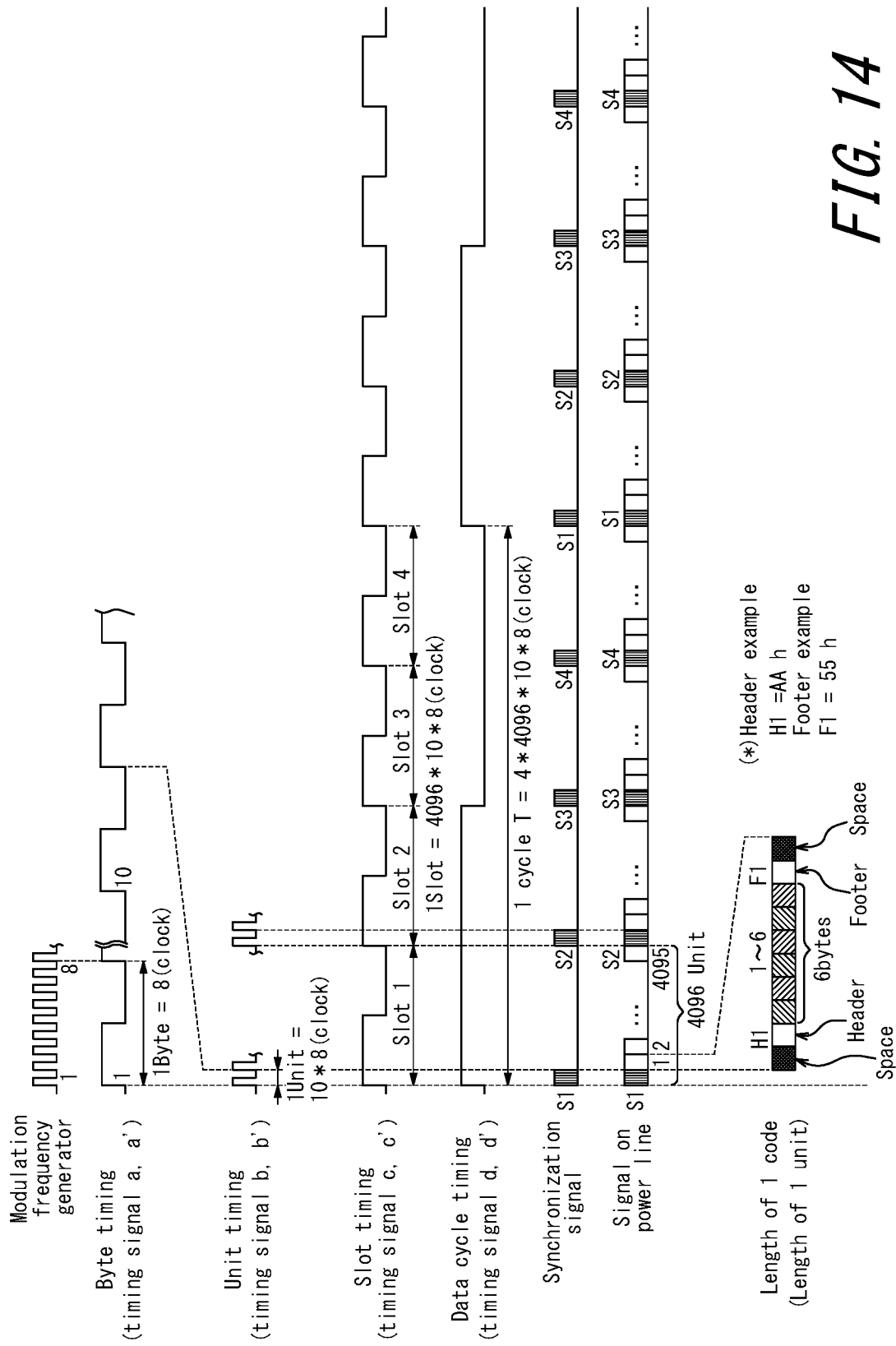
FIG. 14 is a timing chart illustrating an example of various timing signals and synchronization signals generated by a timing generator used in a power wiring network apparatus according to the second embodiment of the present disclosure.

Next, the various timing signals and synchronization signals S1 to S4 generated by the timing generators 130, 230, 530 are described. FIG. 14 is a timing chart illustrating the modulated wave generated by the modulation frequency generator 132 and the various timing signals and synchronization signals S1 to S4 generated from the modulated wave.

During the power line communication implemented by the power wiring network apparatus 2 according to the present embodiment, synchronization signals S1 to S4 are generated in the network management device 100, also referred to as "device 0", and the synchronization signals S1 to S4 are superimposed on DC power on the power line. At timings based on these synchronization signals S1 to S4, each device (the network management device 100, the energy harvesting device 200, the secondary battery device 300, the radio device 400, the interruption/conduction device 500, and the like) transmits data, such as attribute data, a command code, or a status code, and receives data from other devices. Only the network management device 100 (device 0) transmits the synchronization signals S1 to S4 and the command code in the present embodiment.

The network management device 100 (device 0) generates a modulated wave using the modulation frequency generator 132 in the timing generator 130 within the logical data processor 103. The modulated wave is a pulse signal having a cycle corresponding to a one bit period of the data signal, as illustrated by the uppermost portion of FIG. 14. From this modulated wave, the timing generator 130 generates a byte timing signal corresponding to a period of one byte (timing signals a, a' in FIGS. 8 and 11), a unit timing signal corresponding to a period of one unit (timing signals b, b' in FIGS. 8 and 11), a slot timing signal corresponding to a period of one slot (timing signals c, c' in FIGS. 8 and 11), and a data cycle timing signal corresponding to a period of one data cycle (timing signals d, d' in FIGS. 8 and 11).

Figure 15:
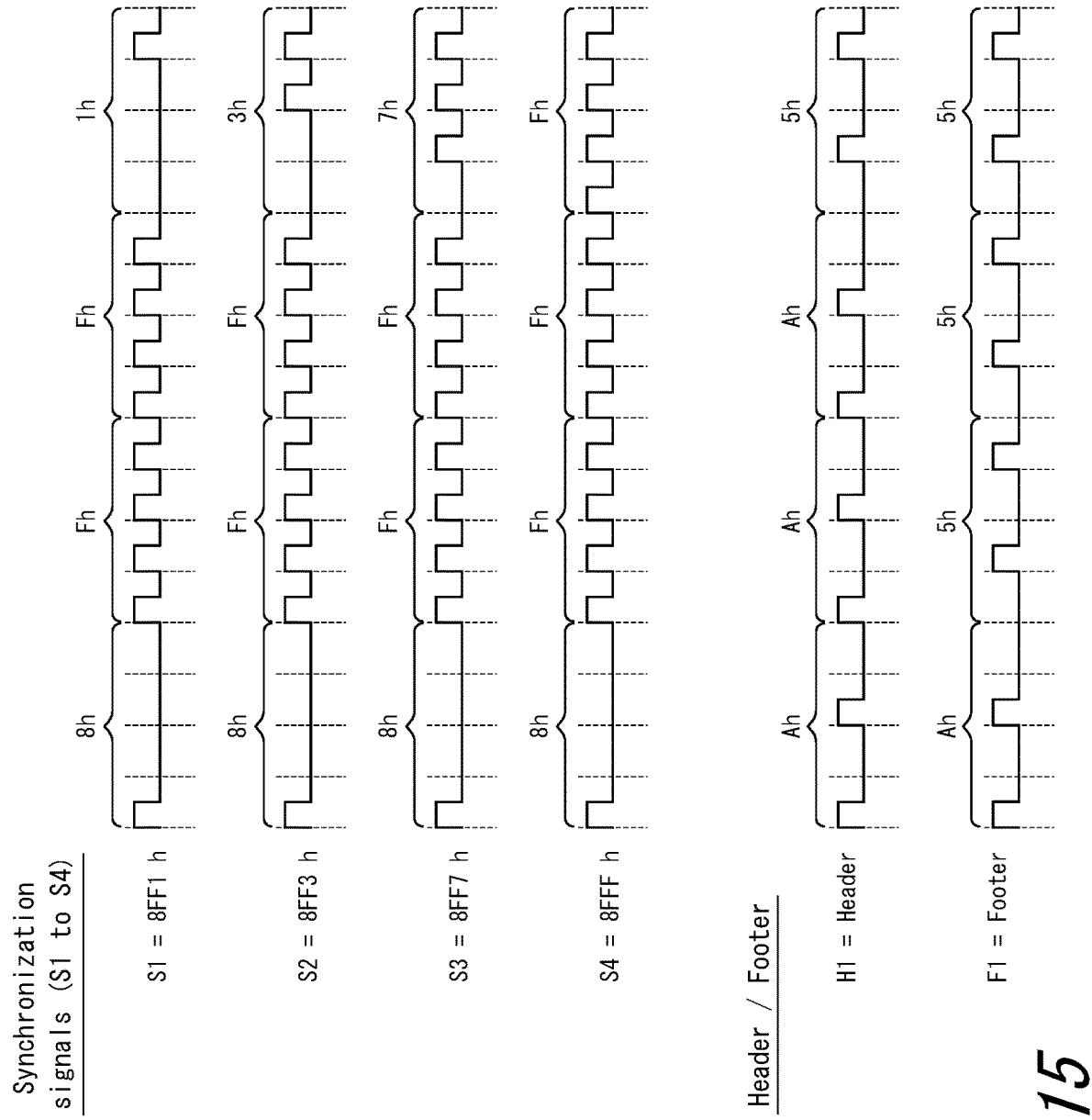
FIG. 15 is an example of synchronization signals and of a header and a footer forming one code of a data signal used in a power wiring network apparatus according to the second embodiment of the present disclosure.

One unit in the timing chart of FIG. 14 corresponds to a data length of 10 bytes. As indicated in the lowermost portion of FIG. 14, data is transmitted and received in units of 10 bytes at a time during the power line communication of the present embodiment. One unit is formed by two bytes for space, two bytes for a header and a footer, and six bytes for data. FIG. 15 illustrates configuration examples of the header and the footer, but these examples are not limiting.

One slot in the timing chart of FIG. 14 corresponds to a data length of 4096 units. In the power line communication of the present embodiment, the synchronization signals S1 to S4 are transmitted in this order from the network management device 100 (device 0) every slot, i.e. every 4096 units. During one slot, each device can transmit 4095 units of a data signal after the synchronization signals S1 to S4 that have a length of one unit.

The synchronization signals S1 to S4 and the header and footer in each unit can, for example, be defined as illustrated in the example of FIG. 15. In the example of FIG. 15, codes are allocated so that the first bit and the last bit become 1 in each signal. This enables the start position and end position of the code to be easily recognized from the data signal.

In the present embodiment, the attribute data of each device is transmitted within the 4095 units following the synchronization signal S1, command data for each device is transmitted within the 4095 units following the synchronization signal S2, and status data from each device is transmitted within the 4095 units following the synchronization signal S3. Accordingly, upon detecting the synchronization signal corresponding to S1 in FIG. 15, each device can recognize that the attribute signal of each device is transmitted after S1. Similarly, upon detecting the synchronization signal corresponding to S2 in FIG. 15, each device can recognize that the command code for each device is transmitted after S2. Upon detecting the synchronization signal corresponding to S3 in FIG. 15, each device can recognize that the status code for each device is transmitted after S3.

Figure 16:
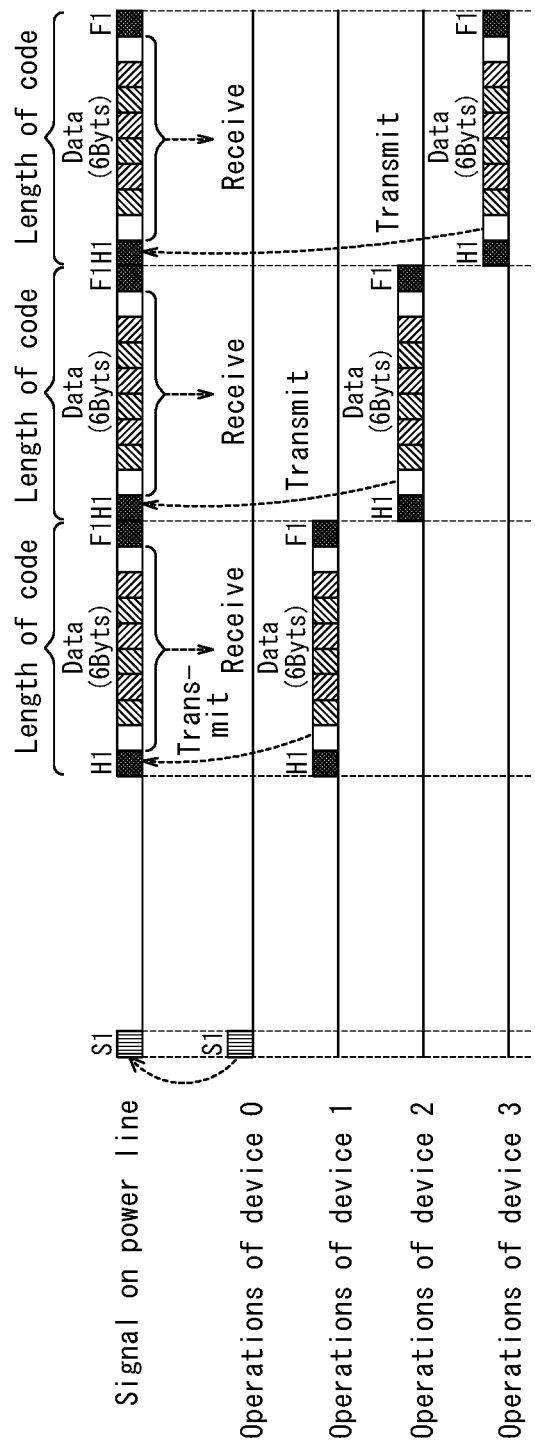
FIG. 16 illustrates transmission and reception of attribute data of each device used in a power wiring network apparatus according to the second embodiment of the present disclosure.

Next, the attribute data transmitted by each device is described. FIG. 16 illustrates attribute data being transmitted and received for the case of at least three devices other than the network management device 100 (device 0) being connected to the wiring member 10. Devices 1, 2, 3, . . . in FIG. 16 indicate the devices other than the network management device 100 (device 0).

The attribute data transmitted by each device is allocated to a domain (i.e. slot 1) with a length of 4095 units after the synchronization signal S1 is outputted. The attribute data is transmitted from each device during this time domain. In FIG. 16, a length of one unit immediately after the synchronization signal S1 occurs is allocated to the network management device 100 (device 0). Only the network management device 100 (device 0) can transmit its own attribute data during the one unit immediately after the synchronization signal S1 occurs (in FIG. 16, the network management device 100 (device 0) does not transmit its own attribute data).

A length of one unit after the elapse of the unit allocated to the network management device 100 (device 0) is allocated to device 1 in the example of FIG. 16. During this period with a length of one unit allocated to device 1, device 1 transmits its own attribute data by superimposing the attribute data on the power line as a data signal. The other devices (device 0, device 2, device 3, and the like) receive the attribute data transmitted by device 1, recognize that device 1 is allocated as the device following device 0, and recognize the attributes of device 1. Accordingly, the attribute data from device 1 fulfills the role of a notification signal providing notification to other devices that device 1 is present. In particular, the network management device 100 (device 0) always receives the data signal during the 4095 units after the synchronization signal S1 and monitors all of the devices present within the network. The network management device 100 (device 0) detects whether each device is present and detects the attribute data. Accordingly, the network management device 100 (device 0) can rapidly detect when a device is inserted or removed. Table 1 illustrates an example of attribute data of a device.

TABLE 1

| Unit position | Byte position | Item | Code | Number of bytes |
|---|---|---|---|---|
| 1 | 1 | device manufacturer | 10h | 1 |
| 1 | 2 | device type | 40h | 1 |
| 1 | 3 | device identifier | 11h | 1 |
| 1 | 4-6 | device characteristics | 00 00 00h | 3 |

The item "device manufacturer" includes a code corresponding to the manufacturer of each device as the attribute data. The "device type" includes a code corresponding to the device type (for example, solar cell, secondary battery, passive load, active load, or the like) as attribute data. The "device identifier" includes a code corresponding to the device identifier (for example, speaker, radio, or the like) as attribute data. The item "device characteristics" includes a code corresponding to other characteristics of the device as the attribute data.

The network management device 100 (device 0) is always used when the power wiring network apparatus 2 is used as a network system. When only the physical layer is used, however, the network management device 100 (device 0) need not be present. The network management device 100 is always allocated to device 0 (device number: 0) in the present embodiment.

A length of one unit after the elapse of the unit for attribute data transmission allocated to device 1 is allocated to device 2 in the example of FIG. 16. During the period with a length of one unit allocated to device 2, device 2 transmits its own attribute data by superimposing the attribute data on the power line as a data signal. The other devices (device 0, device 1, device 3, and the like) can receive this attribute data transmitted from device 2. In particular, the network management device 100 (device 0) recognizes that device 2 is allocated as the device following device 1 and recognizes the attributes of device 2. Accordingly, the attribute data from device 2 fulfills the role of a notification signal providing notification to other devices that device 2 is present. The same holds for device 3.

Each device continues to output attribute data at the timing allocated to the device until being disconnected from the wiring member 10'.

When the domain allocated for attribute data in slot 1 is insufficient, the domain may be expanded to other slots.

Figure 17:
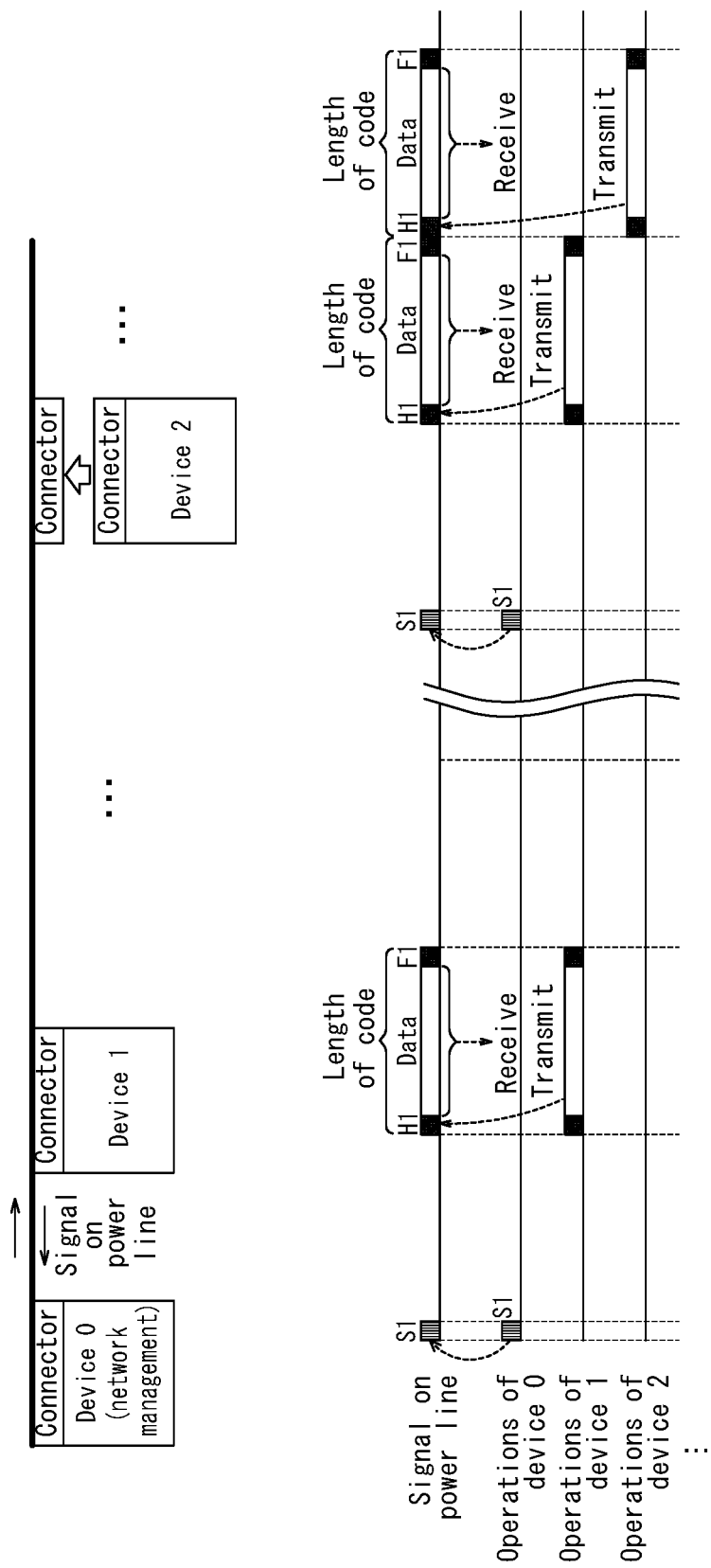
FIG. 17 illustrates transmission and reception of attribute data when a device is newly connected to the network in a power wiring network apparatus according to the second embodiment of the present disclosure.

With reference to FIG. 17, the allocation of the timing for each device to transmit the attribute data is described next. FIG. 17 illustrates operations when device 2 is newly connected during a state in which only the network management device 100 (device 0) and device 1 are connected on the power line, as illustrated at the upper portion of FIG. 17. Only the attribute data of device 1 is transmitted on the power line after output of the first synchronization signal S1 after device 2 is connected, as illustrated in FIG. 17. The network management device 100 (device 0) only detects the attribute data of device 1 after output of the synchronization signal S1 and therefore recognizes that only device 1 is connected to the network. After the newly connected device 2 receives the first synchronization signal S1 after being connected, device 2 receives only the attribute data of device 1 and detects that the next unit after the attribute data of device 1 is a no-signal period. Device 2 receives the second synchronization signal S1, and during the no-signal period that is the next unit after receiving the attribute data of device 1, device 2 transmits its own attribute data. The network management device 100 (device 0) receives the attribute data of device 2 during the unit following the attribute data of device 1 and recognizes that device 2 is connected to the network in addition to device 1.

In this way, the device newly connected to the network (device 2 in the above example) detects the no-signal period closest to the synchronization signal S1 after receiving S1 (excluding the period of one unit, immediately after the synchronization signal S1, allocated to the network management device 100 (device 0)) and occupies the no-signal period as its own attribute data transmission period. The network management device 100 (device 0) recognizes the newly connected device (device 2 in the above example) by newly receiving the attribute data from newly connected device.

When a device from device 1 onward is disconnected during operation of the network management device 100 (device 0), the attribute data transmission period of the disconnected device becomes a no-signal period. A subsequently connected device detects this no-signal period and newly occupies the no-signal period as its own attribute data transmission period.

As illustrated in the upper portion of FIG. 17, the connector position where a device is inserted and the device number do not correspond. When each device detects a no-signal period within slot 1, the device occupies the no-signal period closest to S1 as its own attribute data transmission period and acquires a device number corresponding to the time position of the no-signal period within slot 1. However, device 0 is always allocated to the network management device 100.

In the present embodiment, the attribute data of each device is configured as fixed-length modulation data. This configuration as fixed-length modulation data enables each device to occupy a no-signal period of a fixed length, detected after receipt of the synchronization signal S1, as the device's own fixed-length attribute data transmission period. Since the attribute data is fixed length, the network management device 100 (device 0) can identify the device number of each set of attribute data from only the elapsed time after receipt of the synchronization signal S1.

Figure 18:
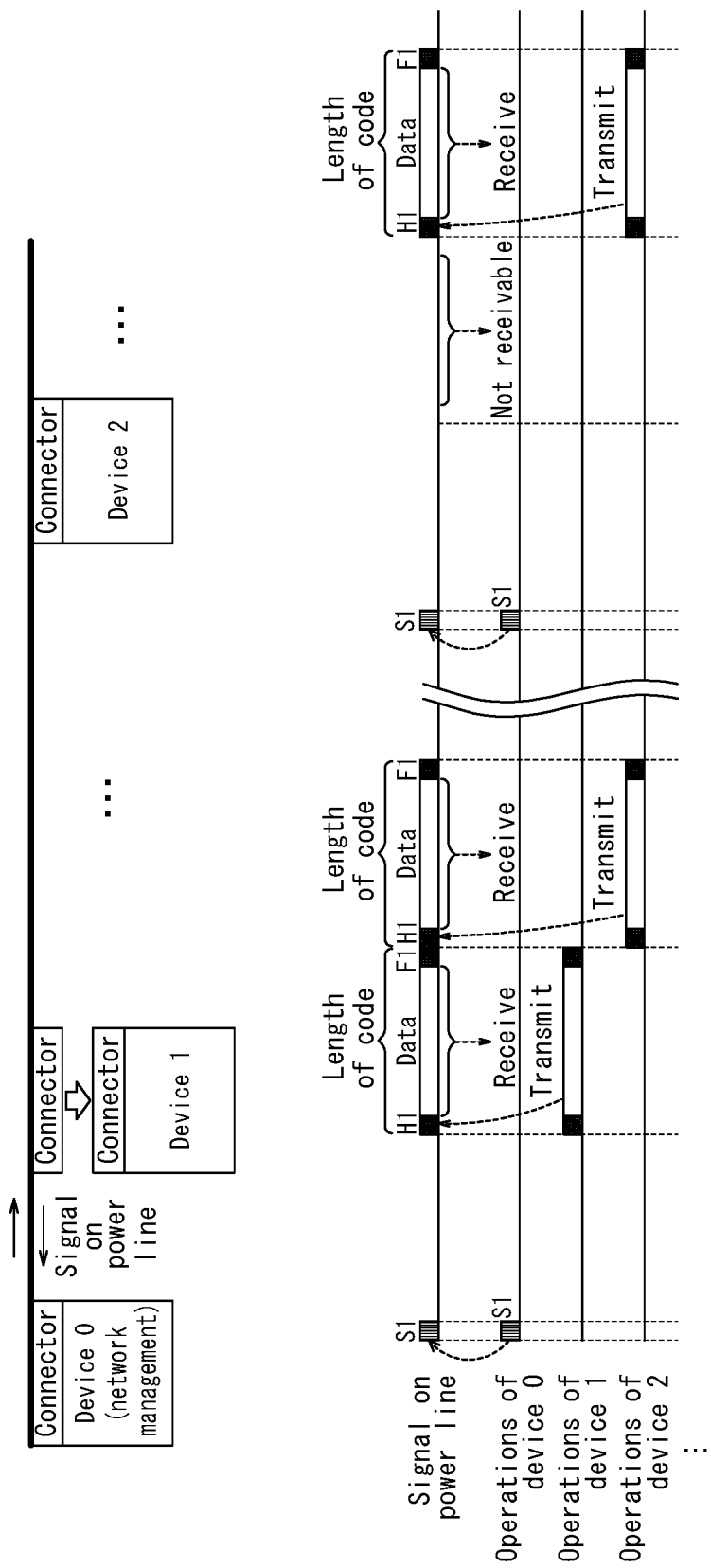
FIG. 18 illustrates transmission and reception of attribute data when a device is disconnected from the network in a power wiring network apparatus according to the second embodiment of the present disclosure.

FIG. 18 illustrates the state in which only device 1 is disconnected from the state illustrated in FIG. 17. In the timing chart illustrated in FIG. 18, the network management device 100 (device 0) receives both the attribute data of device 1 and the attribute data of device 2 after transmitting the first synchronization signal S1 and recognizes that device 1 and device 2 are present on the network. After transmitting the second synchronization signal S1 in FIG. 18, however, the network management device 100 (device 0) can only receive attribute data of device 2 and therefore recognizes that device 1 is not present on the network. The network management device 100 (device 0) recognizes that device 2 is present on the network and continues to exchange data with device 2.

Figure 19:
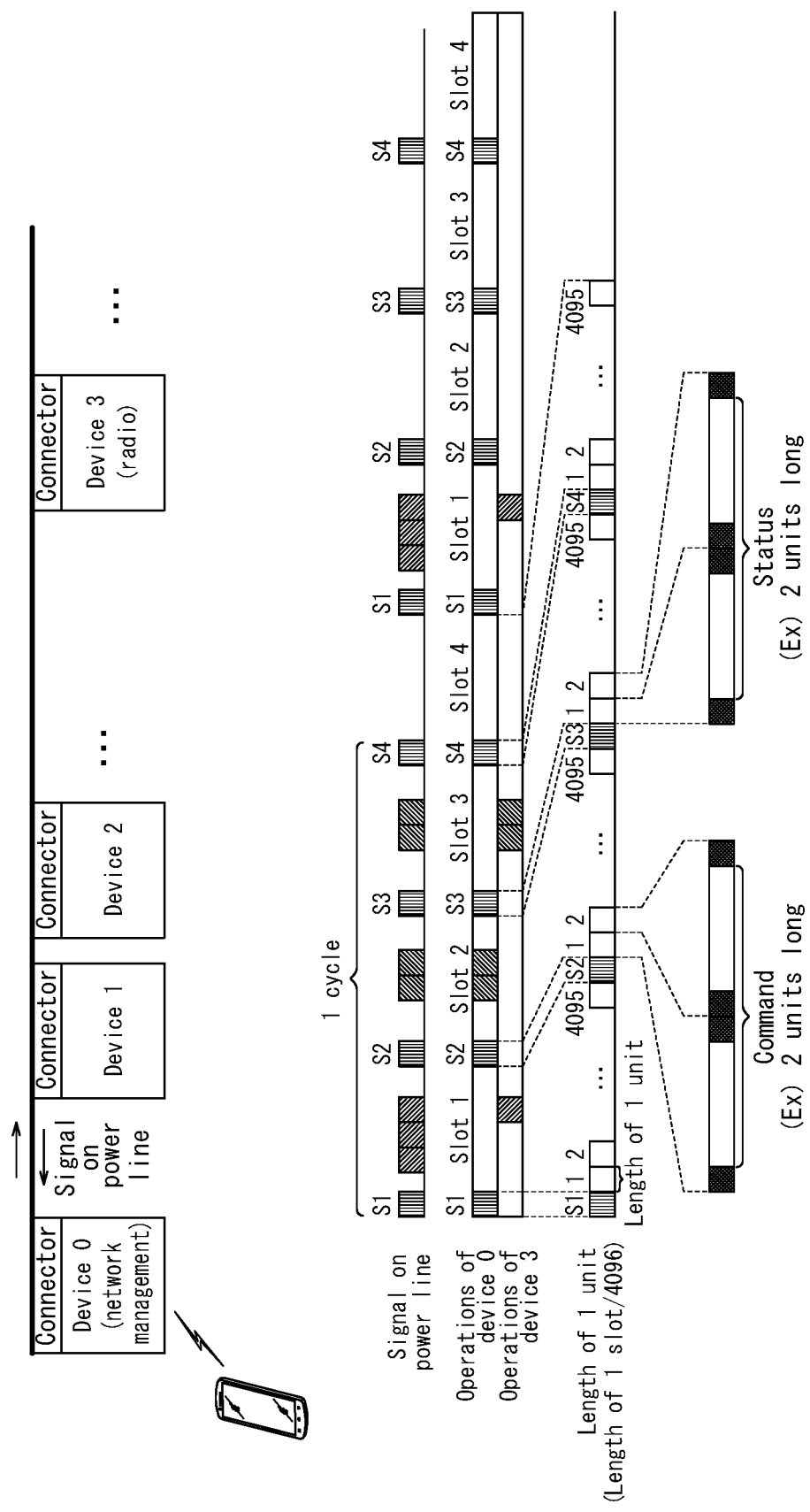
FIG. 19 illustrates transmission and reception of attribute data, commands, and status in a power wiring network apparatus according to the second embodiment of the present disclosure.

The upper portion of FIG. 19 illustrates a state in which the network management device 100 (device 0) and devices 1 to 3 are connected on the power line. FIG. 19 illustrates how, in this state, a command code is transmitted and received after receipt of the synchronization signal S2, and a status code is transmitted and received after receipt of the synchronization signal S3. Devices 1 to 3 are devices other than the network management device 100. Device 3 is assumed to be the radio device 400 as a load element 30. The timing chart of devices 1, 2 in FIG. 19 is omitted.

The network management device 100 (device 0) and devices 1 to 3 are connected to the network illustrated in the upper portion of FIG. 19. Therefore, attribute data from devices 1 to 3 is superimposed on the power line after transmission of the synchronization signal S1 (slot 1). When a length of 4095 units elapses after the synchronization signal S1 is transmitted, the synchronization signal S2 from the network management device 100 (device 0) is transmitted and superimposed on the power line.

The command code transmitted by each device (transmitted by the network management device 100 (device 0) in the present embodiment) is allocated to a domain (i.e. slot 2) with a length of 4095 units after the synchronization signal S2 is outputted. The command code is transmitted from the network management device 100 (device 0) during this time domain. In the example of FIG. 19, a command with a length of two units is transmitted from the network management device 100 (device 0) at the time position of the third unit after the synchronization signal S2 is transmitted. Table 2 illustrates an example of command information.

TABLE 2

| Unit position | Byte position | Item | Code | Number of bytes |
|---|---|---|---|---|
| 1 | 1-2 | command recipient | 0003h | 2 |
| 1 | 3-4 | command allocation unit number | 0003h | 2 |
| 1 | 5-6 | command length | 0002h | 2 |
| 2 | 1-2 | command code | 0800h | 2 |
| 2 | 3-6 | command parameter | 0h - FFFFFFFFh | 4 |

The item "command recipient" designates the recipient of the command by device number. The item "command allocation unit number" designates the unit in slot 2 in which the command is to be transmitted. The "command length" designates the length of the command as a number of units. The "command code" is a code corresponding to an instruction (control information) for each device and is variable length data. The "command parameter" is a parameter appended to the command and is transmitted simultaneously with the command. In the example in Table 2, the command is transmitted to device 3, the command is transmitted in the third unit of slot 2, the command length is two units, and the command code is "0800h".

In the present embodiment, the commands transmittable to the radio device 400 include "power on", "power off", "change AM station", "change FM station", and "adjust volume", for example. When "change AM station" or "change FM station" is transmitted as the command, the station frequency can be increased or decreased by a command parameter being transmitted together with the command. When "adjust volume" is transmitted as the command, the volume can be raised or lowered by a command parameter being transmitted together with the command.

As described above, the command length can be changed in the present embodiment. In other words, a command code containing control information of a device can be transmitted as variable length data. This enables flexible support for devices in accordance with the type of command (control information) or the like and also enables a plurality of circuit elements to share a power line communication environment efficiently.

When a length of 4095 units elapses after the synchronization signal S2 is transmitted, the synchronization signal S3 from the network management device 100 (device 0) is transmitted and superimposed on the power line.

The status code transmitted by each device is allocated to a domain (i.e. slot 3) with a length of 4095 units after the synchronization signal S3 is outputted. The status code is transmitted from each device (device 0 to device 3 in the example of FIG. 19) during this time domain. In the example of FIG. 19, a status code with a length of two units is transmitted from device 3 at the time position of the third unit after the synchronization signal S3 is transmitted. Table 3 illustrates an example of status information.

TABLE 3

| Unit position | Byte position | Item | Code | Number of bytes |
|---|---|---|---|---|
| 1 | 1-2 | status sender | 0003h | 2 |
| 1 | 3-4 | status allocation unit number | 0003h | 2 |
| 1 | 5-6 | status length | 0002h | 2 |
| 2 | 1-2 | status code | 0800h | 2 |
| 2 | 3-6 | status parameter | 0h - FFFFFFFFh | 4 |

The item "status sender" designates the sender of the status information by device number. The item "status allocation unit number" designates the unit in slot 3 in which the status information is to be transmitted. The "status length" designates the length of the status as a number of units. The "status code" is a code corresponding to the status information from each device and is variable length data. The "status parameter" is a parameter appended to the status and is transmitted simultaneously with the status. In the example of Table 3, the status is transmitted from device 3, the status is transmitted in the third unit of slot 3, the status length is two units, and the status code is "0800h".

In the present embodiment, the status transmittable from each device is "normal execution" or "execution error", for example. When the status is "execution error", an error code may be transmitted as a status parameter simultaneously with the status code.

As described above, the status length can be changed in the present embodiment. In other words, a status code containing status information of a device can be transmitted as variable length data. This enables flexible support for devices in accordance with the type of status or the like and also enables a plurality of circuit elements to share a power line communication environment efficiently.

Figure 20A:
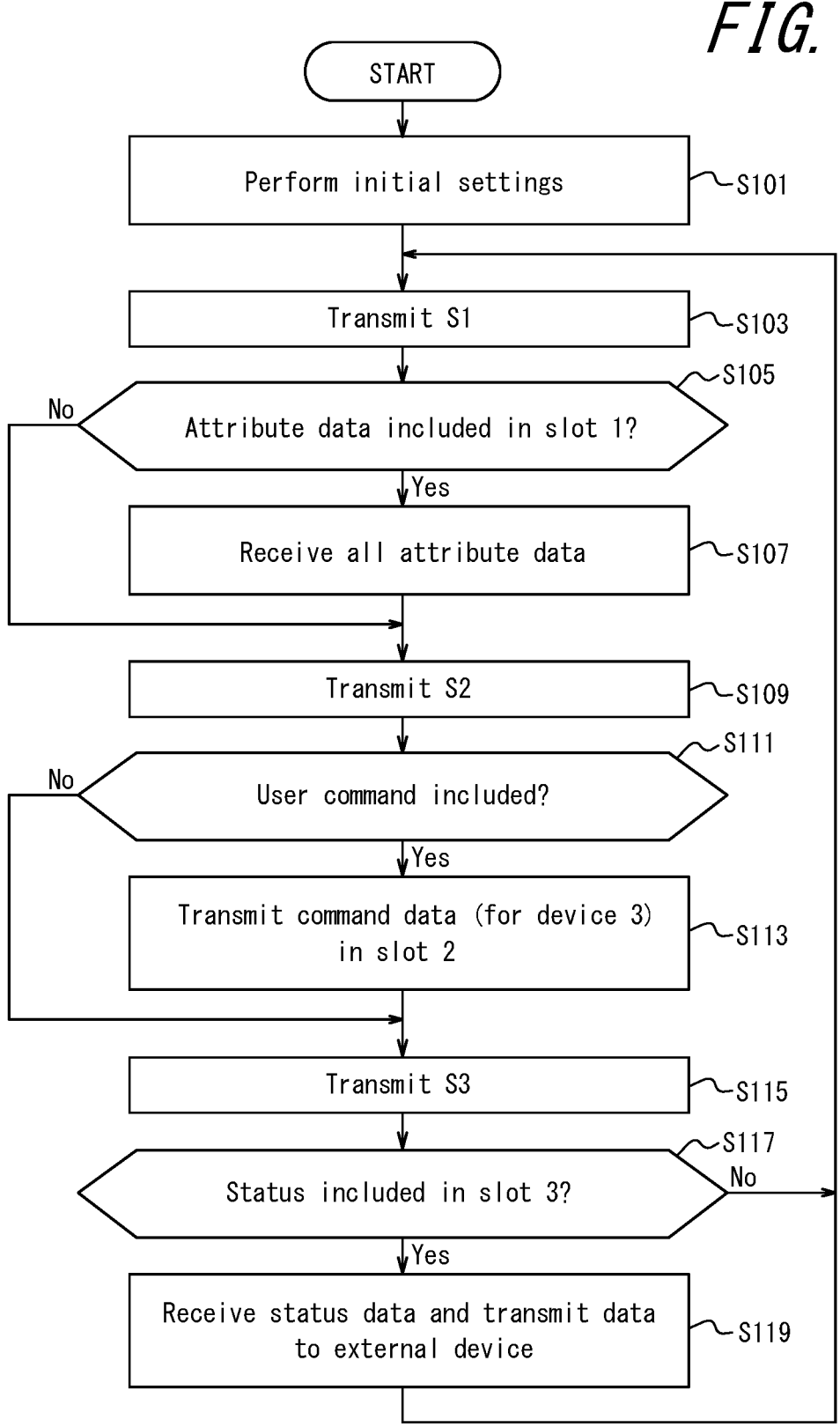
FIG. 20A is a flowchart illustrating transmission and reception of data in a network management device (device 0) in a power wiring network apparatus according to the second embodiment of the present disclosure.
Figure 20B:
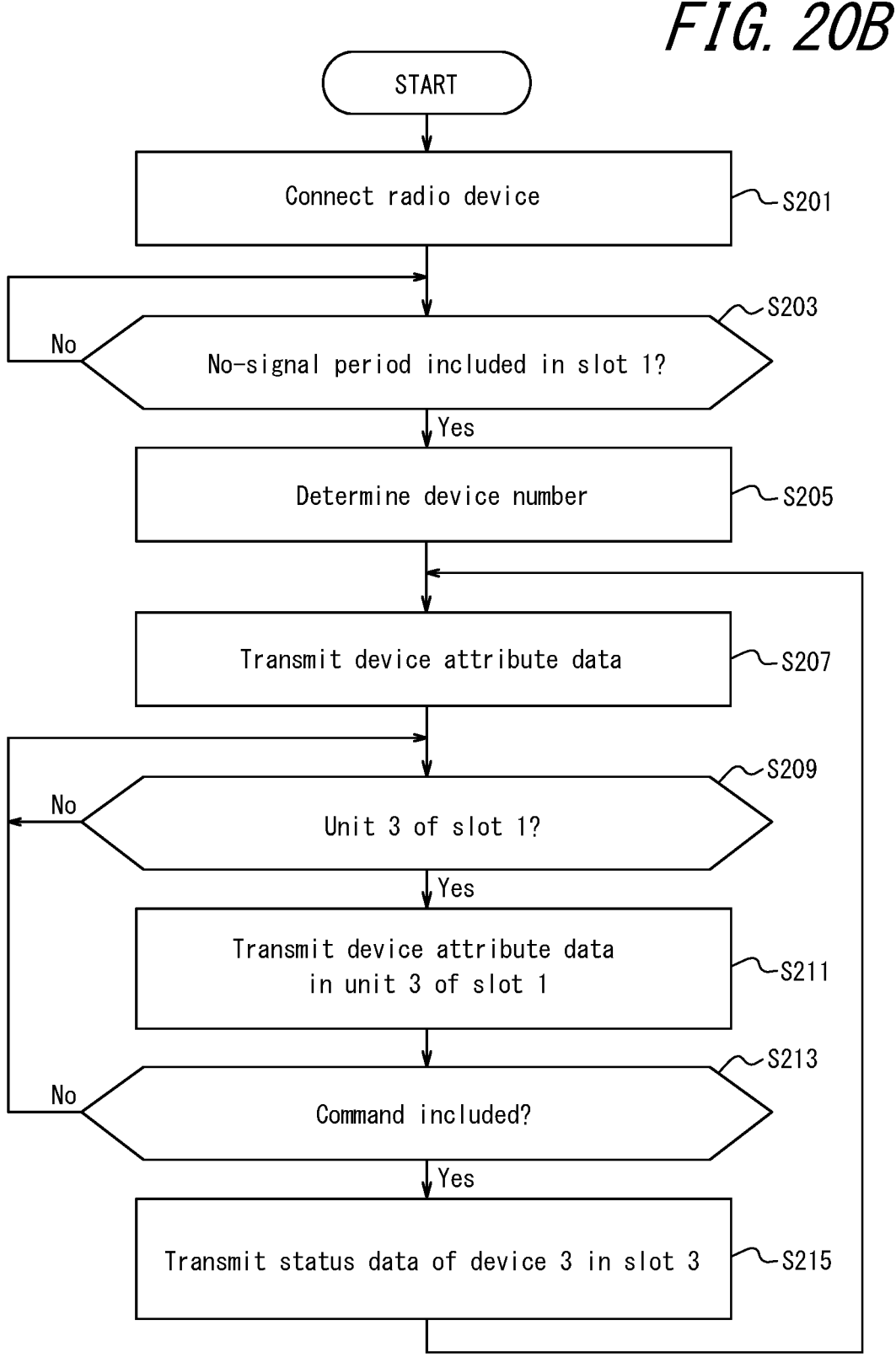
FIG. 20B is a flowchart illustrating transmission and reception of data in a radio device (device 3) in a power wiring network apparatus according to the second embodiment of the present disclosure.

FIGS. 20A and 20B are flowcharts illustrating the flow of transmission and reception of commands and status between the network management device 100 (device 0) and the radio device 400 (device 3).

The network management device 100 (device 0) performs initial settings such as initialization of the controller 101 (step S101) and then transmits the synchronization signal S1 (step S103). After transmitting the synchronization signal S1, the network management device 100 (device 0) judges whether attribute data of another device is present in slot 1 (step S105) and receives all of the attribute data in slot 1 when judging that attribute data is present (step S107). Attribute data is not received when it is judged that attribute data is not present in step S105.

The network management device 100 (device 0) transmits the synchronization signal S2 after a length of 4095 units elapses after transmission of the synchronization signal S1 (step S109). Transmission of the synchronization signal S2 marks the transition from slot 1 to slot 2, and commands can be transmitted and received. The network management device 100 (device 0) confirms whether a user command from the external device 700 is present via the wireless communication interface 105 (step S111) and transmits a power line communication command, corresponding to the user command, for device 3 in slot 2 when the user command is confirmed as being present (step S113).

The network management device 100 (device 0) transmits the synchronization signal S3 after a length of 4095 units elapses after transmission of the synchronization signal S2 (step S115). Transmission of the synchronization signal S3 marks the transition from slot 2 to slot 3, and the status can be transmitted and received. The network management device 100 (device 0) monitors the status during slot 3, i.e. until a length of 4095 units elapses after transmission of the synchronization signal S3. Upon detecting the status (step S117), the network management device 100 (device 0) receives the status and transmits the status information via the wireless communication interface 105 to the external device 700 (step S119).

When the radio device 400 (device 3) is connected to the power line by insertion of the second connector 31 into the first connector 12 (step S201), the radio device 400 (device 3) searches for a no-signal period in slot 1 (step S203). Upon detecting a no-signal period, the radio device 400 (device 3) occupies the no-signal period closest to the synchronization signal S1 after reception of S1 as its own attribute data transmission period and acquires a device number, corresponding to the time position of the no-signal period, as the device number of the radio device 400 (device 3) (step S205).

When the radio device 400 (device 3) receives the synchronization signal S1 the next time, the radio device 400 (device 3) transmits its own attribute data at the time position it occupies as its own attribute data transmission period after the synchronization signal S1 (step S207). Subsequently as well, the radio device 400 (device 3) searches for the third unit position that it occupies as its own attribute data transmission period in slot 1 (step S209) and transmits its own attribute data (step S211).

The radio device 400 (device 3) monitors for a command for itself in slot 2 after transmitting its own attribute data (step S213). The radio device 400 (device 3) confirms whether a command is for the radio device 400 (device 3) by whether its own device number is designated in the item "command recipient" of Table 2. Upon detecting a command for itself, the radio device 400 (device 3) receives the command and transmits a command execution result as a status in slot 3 (step S215).

In this way, the present embodiment includes a wiring member 10', including a plurality of first connectors 12 and a conductive portion 11 electrically connecting the plurality of first connectors 12 in a manner capable of supplying power, and a plurality of circuit elements each including a second connector 21, 31, 41 mechanically and electrically attachable to and detachable from any first connector 12 among the plurality of first connectors 12. The plurality of circuit elements includes an energy harvesting element 20 as a circuit element capable of outputting, from the second connector 21, power generated by energy harvesting and a load element 30 as a circuit element capable of consuming power inputted from the second connector 31. At least some of the energy harvesting elements 20 and the load elements 30 are capable of power line data communication via a power line including the first connectors 12 and the conductive portion 11. This configuration enables the construction of a power wiring network with excellent portability, without the need to maintain infrastructure.

In the present embodiment, the energy harvesting element 20 (energy harvesting device 200) includes a data transmitter 220 configured to transmit data via the second connector 21. This configuration enables another circuit element to be notified, via the data transmitter 220, that the energy harvesting element 20 is connected to the network. Furthermore, the state of the energy harvesting element 20 can be transmitted to another circuit element, enabling efficient use of the power generated by the energy harvesting element 20.

In the present embodiment, at least one load element 30 (network management device 100) includes the data transmitter 120 configured to transmit data via the second connector 31 and includes the data receiver 140 configured to receive data. This configuration enables another circuit element to be notified, via the data transmitter 120, that the load element 30 is connected to the network. Furthermore, the load element 30 can receive a command via the data receiver 140, enabling the user to operate the load element 30 by power line communication.

In the present embodiment, the data transmitters 120, 220 are capable of transmitting a signal yielded by digital modulation of transmission data to another circuit element by superimposing the signal on the power line via the second connector 21, 31. This configuration enables high-speed communication using a power wiring network.

In the present embodiment, the data receiver 140 is configured to receive, via the second connector 31, a signal yielded by digital modulation and superimposed on the power line and is configured to demodulate the signal and generate received data. This configuration enables high-speed communication using a power wiring network.

In the present embodiment, at least one load element 30 (network management device 100) is capable of generating the synchronization signal S1 and of transmitting the synchronization signal S1 to another circuit element, the synchronization signal S1 being for determining the timing of generation of a notification signal for the energy harvesting element 20 or the load element 30 to notify another circuit element that the energy harvesting element 20 or the load element 30 is present. This configuration enables the network management device 100 to easily detect a circuit element in the network.

In the present embodiment, the energy harvesting element 20 or the load element 30 is configured to receive the synchronization signal S1 and to transmit the notification signal of the energy harvesting element 20 or the load element 30 to another circuit element during a predetermined period based on the synchronization signal when the energy harvesting element 20 or the load element 30 detects no signal during the predetermined period. This configuration enables stable communication in accordance with current conditions when a circuit element is added during operation of the network. Furthermore, when a circuit element is removed during operation of the network, the network management device 100 can easily detect the removal of the circuit element.

In the present embodiment, the notification signal includes attribute data of the energy harvesting element 20 or the load element 30, and the attribute data is fixed length modulation data. This configuration enables each circuit element to occupy a no-signal period of a fixed length, detected after receipt of the synchronization signal S1, as the circuit element's own fixed-length attribute data transmission period.

In the present embodiment, at least one load element 30 (network management device 100) is configured to transmit variable length data including control information of the energy harvesting element 20 or the load element 30. This configuration enables efficient sharing of the power line communication environment among a plurality of circuit elements.

In the present embodiment, at least one energy harvesting element 20 or load element 30 is configured to transmit variable length data including status information of the at least one energy harvesting element 20 or load element 30. This configuration enables efficient sharing of the power line communication environment among a plurality of circuit elements.

In the present embodiment, the circuit elements include the switching element 50 capable of switching a plurality of the power lines between being electrically connected to and disconnected from each other. This configuration enables power lines to be separated into a plurality of local networks or integrated into one network. Accordingly, an entire local network can be added to another network. Furthermore, a plurality of local networks can be continually AC coupled, thereby enabling DC power to be cut off between the local networks by the switching element 50 while network communication is enabled between the local networks.

In the present embodiment, the switching element 50 includes the data transmitter 520 configured to transmit data and the data receiver 540 configured to receive data. This configuration enables another circuit element to be notified, via the data transmitter 520, that the switching element 50 is connected to the network. Furthermore, the switching element 50 can receive a command via the data receiver 540, enabling the user to operate the switching element 50 by power line communication.

In the present embodiment, the load element 30 capable of generating the synchronization signal S1 (network management device 100) is further capable of wireless communication by Bluetooth. This configuration enables a user to use circuit elements, which are connected to the power wiring network, by communicating wirelessly with the network management device 100 from the external device 700 such as a smartphone.

Third Embodiment

Figure 21A:
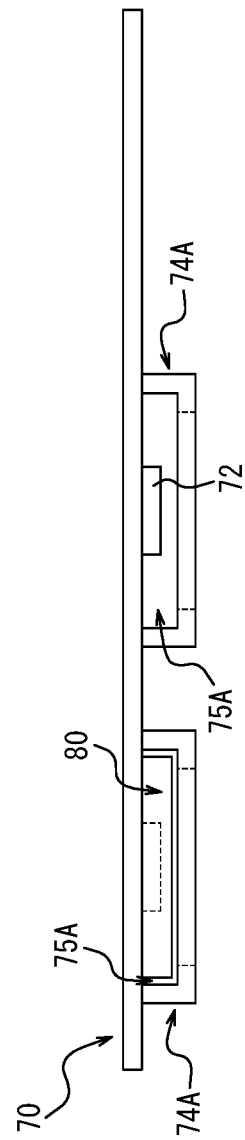
FIG. 21A is a schematic view (back view) of a power wiring network apparatus according to a third embodiment of the present disclosure.
Figure 21B:
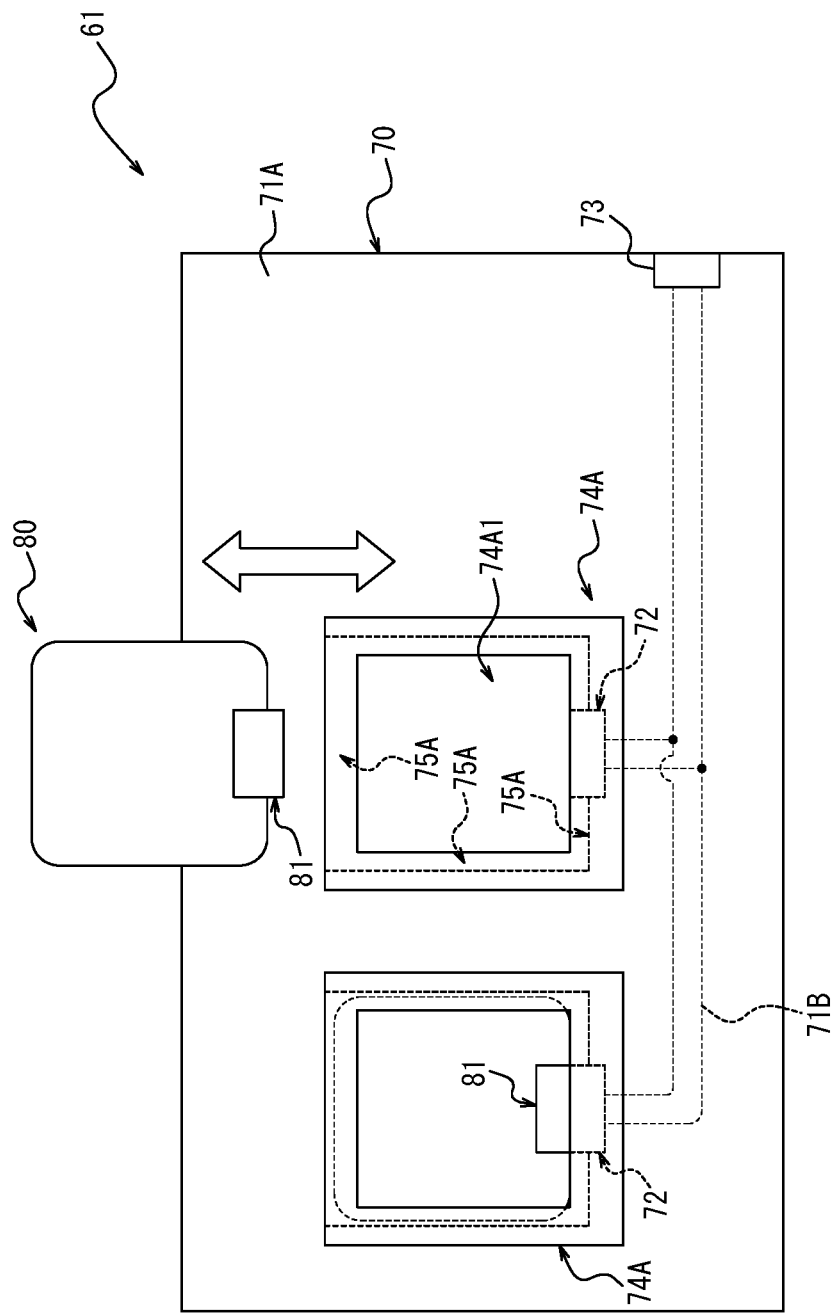
FIG. 21B is a schematic view (plan view) of a power wiring network apparatus according to the third embodiment of the present disclosure.

FIGS. 21A and 21B are schematic diagrams (a rear view and a plan view) of a power wiring network apparatus 61 according to a third embodiment of the present disclosure. The present embodiment illustrates a different embodiment for the physical layer of the power wiring network apparatus than in the first and second embodiments. As illustrated in FIG. 21B, the power wiring network apparatus 61 includes a wiring member 70 and circuit elements 80. The wiring member 70 is formed to have a plate-like planar shape, as illustrated in FIGS. 21A and 21B, and includes a plurality of seventh connectors 72. The power wiring network apparatus 61 includes at least one energy harvesting element inside at least any one of the circuit elements 80. The circuit element 80 is formed to be plate-like and includes an eighth connector 81 mechanically and electrically attachable to and detachable from any seventh connector 72 among the plurality of seventh connectors 72 provided in the wiring member 70. The plurality of seventh connectors 72 are connected to each other electrically by a conductive portion 71B, and the circuit elements 80 attached to the plurality of seventh connectors 72 are connected to each other electrically by the conductive portion 71B. In FIGS. 21A and 21B, the shape of each component in the power wiring network apparatus 61 is prescribed for the sake of explanation, but the actual shapes of components are not limited to these shapes. This also applies to each of the drawings described below.

In the present embodiment, the surface direction of the wiring member 70 and the circuit element 80 refers to the direction parallel to the paper in FIG. 21B, and the thickness direction of the wiring member 70 and the circuit element 80 refers to the direction perpendicular to the paper in FIG. 21B. The upper surface of the wiring member 70 and the circuit element 80 indicates the surface visible in the plan view of FIG. 21B. In other words, the seventh connector 72 and an edge holding member 74A are provided on the upper surface of the wiring member 70. The left-right direction of the wiring member 70 and the circuit element 80 is the left-right direction in FIG. 21B.

As illustrated in FIG. 21B, the wiring member 70 is provided with a board body 71A made of an insulating material, two seventh connectors 72, a conductive portion 71B electrically connecting the seventh connectors 72, an edge holding member 74A holding the edges of the circuit element 80, and a ninth connector 73. The wiring member 70 according to the present embodiment is a planar member that has a rectangular shape in plan view. The wiring member 70 may include a covering, formed by an insulating material, that surrounds the conductive portion 71B. The wiring member 70 can be configured by a board that includes wiring as the conductive portion 71B. The board may be a rigid board, such as a glass epoxy board or paper phenol board, or a flexible printed circuit board made of polyimide film or the like. When a flexible printed circuit board is used in the wiring member 70, a reinforcing plate is preferably provided in the area where electronic components and members such as the edge holding member 74A, described below, are mounted. The reinforcing plate ensures the rigidity of the board body 71A. When a rigid board or a flexible board is used in the wiring member 70, the surface is preferably covered with a covering material, such as cloth or resin, from the perspective of design and resistance to the environment.

Electric current can flow in the extending direction of the conductive portion 71B. The conductive portion 71B includes an electrical conductor. Any electrical conductor may be included in the conductive portion 71B. Examples include conductors made of a metal material such as copper, aluminum, gold, silver, nickel, and iron and conductors made of an alloy material including these metal materials. The conductive portion 71B may have sufficient flexibility to bend back at any point in the extending direction or may be rigid. The conductive portion 71B preferably has flexibility to provide the wiring member 70 with a variable shape and improve the degree of design freedom of the power wiring network apparatus 61 overall.

The two seventh connectors 72 are each connected to the conductive portion 71B. Accordingly, the two seventh connectors 72 are electrically connected to each other in a conductive manner via the conductive portion 71B. In the present embodiment, the two seventh connectors 72 are arranged at a distance from each other along the longitudinal direction (the left-right direction in FIG. 21B) of the wiring member 70. The ninth connector 73 may be provided at the edge of the wiring member 70 as illustrated in FIG. 21B. When the ninth connector 73 is provided on the wiring member 70, the two seventh connectors 72 along with the ninth connector 73 are electrically connected via the conductive portion 71B.

FIGS. 21A and 21B illustrate an example of the wiring member 70 including two seventh connectors 72, but it suffices for the wiring member 70 to include a plurality of seventh connectors 72. In other words, the wiring member 70 may include three or more seventh connectors 72. In this case, the plurality of seventh connectors 72 are conductively connected to each other. The plurality of seventh connectors 72 may be arranged at a distance from each other along the longitudinal direction of the wiring member 70 but are not limited to this configuration. The plurality of seventh connectors 72 may, for example, have the same shape.

The edge holding member 74A is provided in the area surrounding the circuit element 80 in plan view of the wiring member 70, as illustrated in FIG. 21B. The edge holding member 74A includes a housing 75A that houses the edges of the circuit element 80 along the insertion and removal direction of the eighth connector 81 (indicated by the arrow in FIG. 21B). The housing 75A is configured to cover the upper surface and side surfaces of the edges in the left-right direction of the circuit element 80, as illustrated in FIG. 21A. Consequently, when the left and right edges of the circuit element 80 are housed in the housing 75A with the eighth connector 81 facing the seventh connector 72 in plan view, the upper surface of the edges of the circuit element 80 abuts against the edge holding member 74A, which restricts displacement of the circuit element 80 in the thickness direction. Furthermore, the circuit element 80 is positioned in the left-right direction relative to the edge holding member 74A by the left and right sides of the circuit element 80 abutting against the edge holding member 74A. The eighth connector 81 is thus positioned to be attachable to the seventh connector 72. The edge of the circuit element 80 is depicted as having been housed in the housing 75A of the edge holding member 74A at the left side of FIG. 21B, and the eighth connector 81 is depicted as having been attached to the seventh connector 72.

In the example illustrated in FIGS. 21A and 21B, the housing 75A extends not only over the area at the left and right edges of the circuit element 80, but also over the area of the edges adjacent to the left and right of the seventh connector 72 and the area of the edge of the circuit element 80 opposite the seventh connector 72. Accordingly, all four edges of the rectangular circuit element 80 are housable in the housing 75A. The housing 75A at the insertion side when the circuit element 80 is inserted in the edge holding member 74A (the upper side in FIG. 21B, i.e. the housing 75A at the side opposite the seventh connector 72), however, does not restrict the circuit element 80 in the surface direction. The circuit element 80 is insertable in the edge holding member 74A from the side opposite the seventh connector 72 in FIG. 21B. A rectangular opening 74A1 is formed at the central position of the edge holding member 74A in the surface direction, as illustrated in FIG. 21B. When a solar cell is mounted in the circuit element 80 as an energy harvesting element, sunlight can strike the solar cell through the opening 74A1 for power to be generated.

Displacement of the circuit element 80 in the thickness direction is reliably restricted by the housing 75A thus housing all four edges of the circuit element 80, which is rectangular in plan view. Accordingly, even when the power wiring network apparatus 61 is carried with the circuit element 80 attached to the wiring member 70, the circuit element 80 and the wiring member 70 can be stably held in a parallel state so that the circuit element 80 does not separate from the upper surface of the wiring member 70. Furthermore, the circuit element 80 is positioned in the left-right direction relative to the edge holding member 74A by the left and right sides of the circuit element 80 abutting against the edge holding member 74A. The eighth connector 81 can therefore be positioned to be attachable to the seventh connector 72. When the edges of the circuit element 80 are housed in the housing 75A of the edge holding member 74A in this way, the circuit element 80 can be moved in parallel with the wiring member 70 for easy attachment of the eighth connector 81 to the seventh connector 72. Furthermore, the stress on each member when the eighth connector 81 is attached to the seventh connector 72 can be reduced.

In the present embodiment, the circuit element 80 has a rectangular shape in plan view, but this example is not limiting. It suffices for at least a portion of the left and right edges of the circuit element 80 to be linear. The reason is that housing this linear portion in the edge holding member 74A enables the eighth connector 81 to be positioned relative to the seventh connector 72 and mounted while the circuit element 80 is maintained parallel to the wiring member 70. When only the effect of restricting displacement of the circuit element 80 in the thickness direction relative to the wiring member 70 is to be obtained, the shape of the circuit element 80 need not have a linear portion on the edges and may instead have a shape formed only by curves, such as a circle. The shape of the housing 75A of the edge holding member 74A may also be curved as appropriate in correspondence with the shape of the edges of the circuit element 80.

The wiring member 70 (board body 71A) need not be disposed over the entire area where the circuit element 80 is mounted on the wiring member 70. To reduce weight, the wiring member 70 (board body 71A) may be disposed only in the portion for supporting the circuit element 80, such as the portion in contact with the perimeter of the circuit element 80.

As illustrated in FIG. 21B, the circuit element 80 includes the eighth connector 81. In FIG. 21B, the eight connector 81 of a circuit element 80 has been attached to the seventh connector 72 on the left, and the eighth connector 81 of a circuit element 80 is about to be attached to the seventh connector 72 on the right. The eighth connector 81 in the example illustrated in FIG. 21B is provided on an edge of the circuit element 80. When the central position in the thickness direction in the portion of the eighth connector 81 that abuts against the seventh connector 72 substantially matches the central position in the thickness direction at the edge of the circuit element 80 where the eighth connector 81 is disposed, excessive stress can be suppressed, such as bending stress upon insertion or removal, making this configuration preferable. In the present embodiment, the insertion and removal direction of the eighth connector 81 relative to the seventh connector 72 is the up-down direction in FIG. 21B and is parallel to the surface direction of the circuit element 80. Consequently, the circuit element 80 does not project in the thickness direction when attached or detached, enabling a reduction in the thickness of the power wiring network apparatus 61 that takes into account attachment and detachment of the circuit element 80. Furthermore, when the circuit element 80 is attached or detached, it suffices to exert a force in the surface direction of the circuit element 80. This configuration can suppress an excessive stress, such as bending stress, on each member. In the example in FIG. 21B, the insertion and removal direction of the eighth connector 81 relative to the seventh connector 72 is also parallel to the surface direction of the wiring member 70.

The circuit element 80 can, for example, include an energy harvesting element. The energy harvesting element is capable of outputting, from the eighth connector 81, power generated by energy harvesting. When a plurality of circuit elements 80 that include an energy harvesting element is attached to the wiring member 70, the power generation capability of the energy harvesting elements may differ.

In the present embodiment, at least one circuit element 80 between the two circuit elements 80 connected to the two seventh connectors 72 of FIG. 21B includes an energy harvesting element. Consequently, power generated by energy harvesting can be outputted from the eighth connector 81, and power can be supplied to a load element connected to the wiring member 70.

The eighth connector 81 is mechanically and electrically attachable to and detachable from any of the seventh connectors 72 included in the wiring member 70. In the present disclosure, stating that two connectors are "mechanically and electrically attachable and detachable" refers to one of the connectors being attachable to the other connector and being detachable after attachment. In a state in which one connector is attached to the other connector, the two connectors are mechanically and electrically connected to each other. In a state in which one connector is detached from the other connector, the two connectors are mechanically and electrically disconnected from each other.

The energy harvesting element mounted in the circuit element 80 can, for example, be configured to include an energy harvesting unit (not illustrated), capable of generating power by energy harvesting, and a reverse current prevention unit (not illustrated). In this case, the energy harvesting unit generates power in accordance with the external environment and includes a solar cell, for example, that generates power using light energy such as sunlight or room light. Alternatively, the energy harvesting unit may include a thermoelectric conversion element that generates power using thermal energy such as geothermal energy. The energy harvesting unit outputs the generated power to the eighth connector 81 via the reverse current prevention unit.

The reverse current prevention unit prevents current from the eighth connector 81 from flowing into the energy harvesting unit. The reverse current prevention unit can include a circuit element such as a diode. When a diode is used as the reverse current prevention unit, the diode is connected so that the anode is on the energy harvesting unit side, and the cathode is on the eighth connector 81 side. The collector and the base terminals of a transistor may be connected and paired with the emitter for use as a diode in the reverse current prevention unit.

The energy harvesting unit may be an energy harvesting unit included in another circuit element connected via the circuit element 80.

Along with the energy harvesting element, the circuit element 80 can include a load element. The load element is capable of consuming power inputted from the eighth connector 81. In FIG. 21B, one circuit element 80 of the two circuit elements 80 attached via the two seventh connectors 72 may include an energy harvesting element, whereas the other circuit element 80 may include a load element. At least one of the circuit elements 80 may include a load element together with an energy harvesting element. To supplement the power from the energy harvesting element, the circuit element 80 may include a charged secondary battery element, described below, or may be configured to supply auxiliary power to the load element from another apparatus via the ninth connector 73. When a plurality of load elements is included in the circuit element 80, the power consumption of each load element may differ.

When a load element is mounted in the circuit element 80, the circuit element 80 can include a load and a voltage controller in addition to the eighth connector 81. The eighth connector 81 and the voltage controller are electrically connected to each other directly or via electrical wiring. The voltage controller and the load are electrically connected to each other directly or via electrical wiring.

The voltage controller controls the power inputted from the eighth connector 81 to be a predetermined voltage and outputs the result to the load. In greater detail, the voltage controller steps down or steps up the power inputted from the eighth connector 81 to a predetermined voltage suitable for driving the load, such as the rated voltage of the load, and outputs the result to the load.

The power wiring network apparatus 61 may further include a secondary battery element as a circuit element. When the circuit element 80 includes a secondary battery element, the circuit element 80 can include a secondary battery, a switch, a voltage controller, and a reverse current prevention unit, for example, in addition to the above-described eight connector 81.

The switch is capable of switching between a charging state of charging the secondary battery with power inputted from the eighth connector 81 and a power supply state of outputting, from the eighth connector 81, power from the secondary battery. The switch includes a switching element, for example, electrically connected between the eighth connector 81 and the secondary battery.

The voltage controller controls the power inputted from the eighth connector 81 to be a predetermined voltage and outputs the result to the secondary battery. In greater detail, the voltage controller steps down or steps up the power inputted from the eighth connector 81 to a predetermined voltage suitable for charging the secondary battery, such as the rated voltage of the secondary battery, and outputs the result to the secondary battery. The voltage controller also controls the power inputted from the secondary battery to be a predetermined voltage and outputs the result to the eighth connector 81. In greater detail, the voltage controller steps down or steps up the power inputted from the secondary battery to a predetermined voltage suitable for another circuit element, such as a load element, and outputs the result to the eighth connector 81.

When the switch is in the power supply state, the reverse current prevention unit suppresses current from the eighth connector 81 from flowing into the secondary battery. The reverse current prevention unit can include a circuit element such as a diode. When a diode is used as the reverse current prevention unit, the diode is connected so that the anode is on the secondary battery side, and the cathode is on the eighth connector 81 side.

When the circuit element 80 includes a secondary battery element in this way, power can be supplied to the load element stably by switching between the charging state and the power supply state of the secondary battery element depending on conditions. For example, the secondary battery element may be placed in the power supply state when power supply to the load element is insufficient and be placed in the charging state when power supply to the load element is sufficient.

Fourth Embodiment

Figure 22:
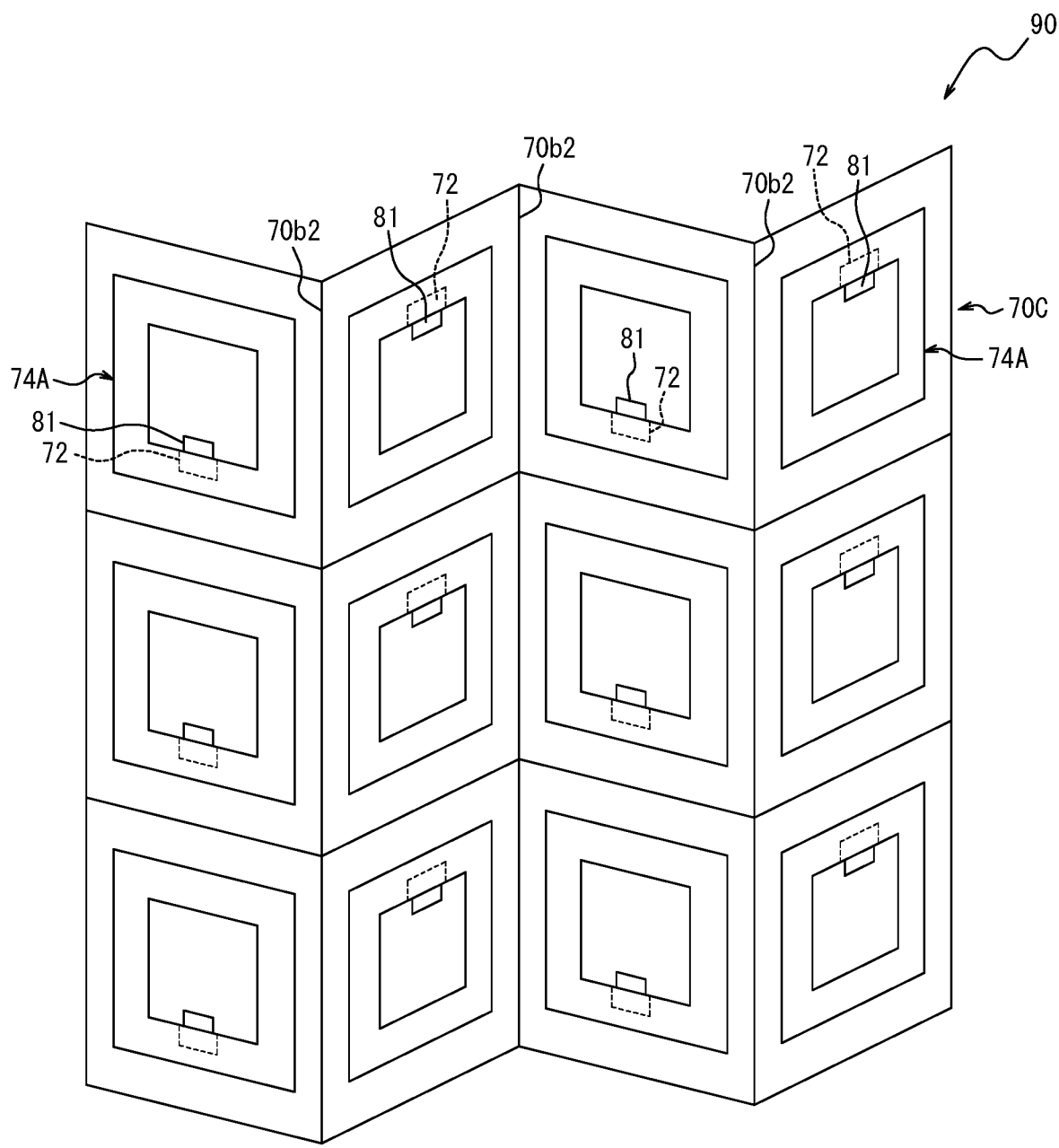
FIG. 22 is a schematic view of a power wiring network apparatus according to a fourth embodiment of the present disclosure.

FIG. 22 is a schematic diagram (perspective view) of a power wiring network apparatus 90 according to a fourth embodiment of the present disclosure. The power wiring network apparatus 90 is a modification to the power wiring network apparatus 61 illustrated in FIGS. 21A and 21B. Four seventh connectors 72 in the left-right direction and three in the up-down direction of FIG. 22 are arranged in a matrix on the upper surface of a wiring member 70C, for a total of 12 seventh connectors 72. A bending position 70b2 extending in the up-down direction of FIG. 22 is defined at an in-plane position, between two seventh connectors 72 adjacent in the left-right direction, where no external circuit element 80 is disposed. Two seventh connectors 72 adjacent in the left-right direction in FIG. 22 are arranged so that one is rotated 180 degrees relative to the other about a central axis perpendicular to the surface direction of the wiring member 70C. Accordingly, when the user bends the wiring member 70C at the bending positions 70b2 so that mountain folds and valley folds alternate, seventh connectors 72 opposite each other do not completely overlap but rather are separated in the up-down direction of FIG. 22 substantially by the vertical length of the circuit element 80. In other words, two seventh connectors 72 adjacent to a bending position 70*b*2 are disposed at in-plane positions that do not overlap in the surface direction when the wiring member 70C is bent at the bending position 70*b*2. Accordingly, the thickness in the direction of overlap when the power wiring network apparatus 90 is bent can be reduced, thereby increasing the portability of the power wiring network apparatus 90.

The configuration of the power wiring network apparatus 90 can be achieved by, for example, forming the wiring member 70C as a flexible printed circuit board, providing a reinforcing plate in the area where the circuit element 80 is disposed to ensure rigidity of the wiring member 70C, and not providing a reinforcing plate at the bending position 70*b*2. The configuration of the power wiring network apparatus 90 may also be achieved by using a circuit board in which a rigid board and a flexible printed circuit board are integrated and arranging the flexible printed circuit board at the bending position 70*b*2.

The case of bending in one dimension along the column direction is illustrated in FIG. 22, but the power wiring network apparatus 90 may be bent in two dimensions along the row and column directions.

Any of the energy harvesting elements included among the circuit elements of the first, third, and fourth embodiments described above can operate as the energy harvesting device 200 of the second embodiment. Any of the load elements included among the circuit elements of the first, third, and fourth embodiments described above can operate as the network management device 100, the radio device 400, or the like of the second embodiment. Any of the secondary battery elements included among the circuit elements of the first, third, and fourth embodiments described above can operate as the secondary battery device 300 of the second embodiment.

While the disclosed apparatus has been described by way of the drawings and embodiments, various changes or modifications may be made by those of ordinary skill in the art based on the present disclosure. Such changes or modifications are therefore included in the scope of the present disclosure. For example, the functions and the like included in the components may be rearranged in any logically consistent way, a plurality of components may be combined into one, and a single component may be divided into a plurality of components. These configurations are also included in the scope of the present disclosure.

For example, it suffices for the above-described connectors to be combined to be attachable to and detachable from each other. One connector may be male and the other female, for example. When the first connector 12 is a male connector, the second connector (for example, the second connector 21, 31, and 41) that is attachable to and detachable from the first connector 12 is a female connector. Conversely, when the first connector 12 is a female connector, the second connector that is attachable to and detachable from the first connector 12 is a male connector. When the third connector 13 is a male connector, the fourth connector 14 and fifth connector 51 that are attachable to and detachable from the third connector 13 are female connectors, and the sixth connector 52 that is attachable to and detachable from the fourth connector 14 is a male connector. Conversely, when the third connector 13 is a female connector, the fourth connector 14 and fifth connector 51 that are attachable to and detachable from the third connector 13 are male connectors, and the sixth connector 52 that is attachable to and detachable from the fourth connector 14 is a female connector.

A configuration such that the third connector 13 and the first connector 12 are the same and the fourth connector 14 and the second connector are the same may be adopted. Alternatively, a configuration such that the third connector 13 and the second connector are the same and the fourth connector 14 and the first connector 12 are the same may be adopted.

Both the third connector 13 and the fourth connector 14 may be the same as the first connector 12. In this case, the fifth connector 51 and the sixth connector 52 may be the same as the second connector.

Both the third connector 13 and the fourth connector 14 may be the same as the second connector. In this case, the fifth connector 51 and the sixth connector 52 may be the same as the first connector 12.

The energy harvesting element 20 need not include the reverse current prevention unit 23. The energy harvesting element 20 preferably includes the reverse current prevention unit 23, however, to help prevent current from circuit elements such as other energy harvesting elements 20 from flowing into the energy harvesting unit 22 or into an external energy harvesting unit 25. The energy harvesting element 20 may include a voltage controller to control the output voltage to be constant.

The load element 30 need not include the voltage controller 33. The load element 30 preferably includes the voltage controller 33, however, to help prevent power from circuit elements such as the energy harvesting element 20 from being inputted to the load 32 or the external load 35 at higher than rated voltage, for example.

The secondary battery element 40 need not include the voltage controller 44. The secondary battery element 40 preferably includes the voltage controller 44, however, so as to control the voltage of power inputted to and outputted from the secondary battery 42.

The secondary battery element 40 need not include the reverse current prevention unit 45. The secondary battery element 40 preferably includes the reverse current prevention unit 45, however, to help prevent current from circuit elements such as other energy harvesting elements 20 from flowing into the secondary battery 42 when the switch 43 is in the power supply state.

The load element 30, the energy harvesting element 20, the secondary battery element 40, and the switching element 50 can be freely combined. For example, the load element 30 (network management device 100) and the energy harvesting element 20 (energy harvesting device 200) may be configured physically as one device.

In the example in FIG. 6, the load element 30 (network management device 100) is configured so that the controller 101, the logical data processor 103, the wireless communication interface 105, and the storage 106 are separate constituent elements, but this configuration is not limiting. The controller 101 may be configured to be capable of executing a portion or all of the functions of other constituent elements (such as the logical data processor 103). The same holds for other load elements 30 (the radio device 400 or the like), the energy harvesting element 20, the secondary battery element 40, the switching element 50, and the like.

In the present embodiment (power wiring network apparatus 2), all of the circuit elements include the logical data processor 103, 203, 503 and have a data transmission and reception function, but this configuration is not limiting. It suffices for at least some of the energy harvesting elements 20 and load elements 30 connected to the power line to be capable of power line communication.

In the present embodiment (power wiring network apparatus 2), the load element 30 (network management device 100) includes the wireless communication interface 105, but this configuration is not limiting. The load element 30 may be configured not to include the wireless communication interface 105. The wireless communication interface 105 is not limited to Bluetooth or Wi-Fi and may support wireless communication via a base station.

INDUSTRIAL APPLICABILITY

The present disclosure can provide a power wiring network apparatus 1, 2 capable of constructing a power network with excellent portability, without the need to maintain infrastructure.

REFERENCE SIGNS LIST

1, 2, 61, 90 Power wiring network apparatus
10, 10' Wiring member
11 Conductive portion
12, 12a, 12b, 12c, 12d First connector
13 Third connector
14 Fourth connector
20, 20a, 20b Energy harvesting element
21 Second connector
22 Energy harvesting unit
23 Reverse current prevention unit
24 Connector for power generator connection
25 External energy harvesting unit
26 Connector
30, 30a, 30b Load element
31 Second connector
32 Load
33 Voltage controller
34 Connector for load connection
35 External load
36 Connector
40 Secondary battery element
41 Second connector
42 Secondary battery
43 Switch
44 Voltage controller
45 Reverse current prevention unit
50 Switching element
51 Fifth connector
52 Sixth connector
53 Switch
70 Wiring member
70b2 Bending position
70C Wiring member
71A Board body
71B Conductive portion
72 Seventh connector
73 Ninth connector
74A Edge holding member
74A1 Opening
75A Housing
80 Circuit element
81 Eighth connector
100 Network management device
101 Controller
103 Logical data processor
105 Wireless communication interface
106 Storage
107 ROM
108 RAM
109 Flash ROM
110 Transmission/reception data processor
111 Device attribute information generation unit
112 Command information generation unit
113 Status information generation unit
115 Transmission data generation unit
116 Received data storage
117 Received data analyzer
118 Device control information generation unit
120 Data transmitter (second transmitter)
121 Transmission data modulator
122 Signal level adjuster
130 Timing generator
132 Modulation frequency generator
134 Divider
140 Data receiver (receiver)
141 Signal level adjuster
142 Received data demodulator
150 Synchronization signal generation unit
151 Synchronization signal generator
152 Signal level adjuster
170 Filter
200 Energy harvesting device
201 Power generator
203 Logical data processor
210 Transmission/reception data processor
211 Device attribute information generation unit
212 Command information generation unit
213 Status information generation unit
216 Received data storage
217 Received data analyzer
218 Device control information generation unit
220 Data transmitter (first transmitter)
221 Transmission data modulator
222 Signal level adjuster
230 Timing generator
231 Signal level adjuster
232 Synchronization signal detector
233 Voltage-controlled oscillator
234 Divider
235 Phase comparator
236 Low pass filter
240 Data receiver
241 Signal level adjuster
242 Received data demodulator
270 Filter
300 Secondary battery device
301 Battery unit
400 Radio device
401 Radio
500 Interruption/conduction device
501 Controller
503 Logical data processor
505 I/O processor
506 Storage
507 ROM
508 RAM
510 Transmission/reception data processor
511 Device attribute information generation unit
512 Command information generation unit
513 Status information generation unit
515 Transmission data generation unit
516 Received data storage
517 Received data analyzer
518 Device control information generation unit
520 Data transmitter (second transmitter)
521 Transmission data modulator
522 Signal level adjuster
530 Timing generator
540 Data receiver 541 Signal level adjuster
542 Received data demodulator
570 Filter
700 External device
S1, S2, S3, S4 Synchronization signal

The invention claimed is:
1. A power wiring network apparatus comprising:
a wiring member comprising a plurality of first connectors and a conductive portion electrically connecting the plurality of first connectors in a manner capable of supplying power; and
a plurality of circuit elements each comprising a second connector mechanically and electrically attachable to and detachable from any first connector among the plurality of first connectors;
wherein the plurality of circuit elements comprises
an energy harvesting element as a circuit element capable of outputting, from the second connector, power generated by energy harvesting; and
a load element as a circuit element capable of consuming power inputted from the second connector;
wherein the energy harvesting element outputs the power generated by energy harvesting from the second connector via a reverse current prevention unit, and communication data for power line data communication is input into / output from a logical data processor connected in parallel with the reverse current prevention unit via the second connector; and
wherein at least some of the energy harvesting element and the load element are capable of power line data communication via a power line including the first connectors and the conductive portion.

2. The power wiring network apparatus of claim 1, wherein the energy harvesting element comprises a first transmitter configured to transmit data via the second connector.

3. The power wiring network apparatus of claim 1, wherein at least one load element comprises a second transmitter configured to transmit data via the second connector and/or comprises a receiver configured to receive data.

4. The power wiring network apparatus of claim 2, wherein the first transmitter or the second transmitter is capable of transmitting a signal yielded by digital modulation of transmission data to another circuit element by superimposing the signal on the power line via the second connector.

5. The power wiring network apparatus of claim 3, wherein the receiver is configured to receive, via the second connector, a signal yielded by digital modulation and superimposed on the power line and is configured to demodulate the signal and generate received data.

6. The power wiring network apparatus of claim 1, wherein at least one load element is capable of generating a synchronization signal and of transmitting the synchronization signal to another circuit element, the synchronization signal being for determining a timing of generation of a notification signal for the energy harvesting element or the load element to notify another circuit element that the energy harvesting element or the load element is present.

7. The power wiring network apparatus of claim 6, wherein the energy harvesting element or the load element is configured to receive the synchronization signal and to transmit the notification signal of the energy harvesting element or the load element to another circuit element during a predetermined period based on the synchronization signal when the energy harvesting element or the load element detects no signal during the predetermined period.

8. The power wiring network apparatus of claim 6, wherein the notification signal includes attribute data of the energy harvesting element or the load element, and the attribute data is fixed length modulation data.

9. The power wiring network apparatus of claim 1, wherein at least one load element is configured to transmit variable length data including control information of the energy harvesting element or the load element.

10. The power wiring network apparatus of claim 1, wherein at least one energy harvesting element or load element is configured to transmit variable length data including status information of the at least one energy harvesting element or load element.

11. The power wiring network apparatus of claim 1, wherein the circuit elements include a switching element capable of switching a plurality of the power lines between being electrically connected to and disconnected from each other.

12. The power wiring network apparatus of claim 11, wherein the switching element comprises a second transmitter configured to transmit data and/or a receiver configured to receive data.

13. The power wiring network apparatus of any one of claim 6, wherein the load element capable of generating the synchronization signal is further capable of wireless communication by Bluetooth.

14. The power wiring network apparatus of claim 2, wherein at least one load element comprises a second transmitter configured to transmit data via the second connector and/or comprises a receiver configured to receive data.

15. The power wiring network apparatus of claim 3, wherein the first transmitter or the second transmitter is capable of transmitting a signal yielded by digital modulation of transmission data to another circuit element by superimposing the signal on the power line via the second connector.

16. The power wiring network apparatus of claim 2, wherein at least one load element is capable of generating a synchronization signal and of transmitting the synchronization signal to another circuit element, the synchronization signal being for determining a timing of generation of a notification signal for the energy harvesting element or the load element to notify another circuit element that the energy harvesting element or the load element is present.

17. The power wiring network apparatus of claim 3, wherein at least one load element is capable of generating a synchronization signal and of transmitting the synchronization signal to another circuit element, the synchronization signal being for determining a timing of generation of a notification signal for the energy harvesting element or the load element to notify another circuit element that the energy harvesting element or the load element is present.

18. The power wiring network apparatus of claim 4, wherein at least one load element is capable of generating a synchronization signal and of transmitting the synchronization signal to another circuit element, the synchronization signal being for determining a timing of generation of a notification signal for the energy harvesting element or the load element to notify another circuit element that the energy harvesting element or the load element is present.

19. The power wiring network apparatus of claim 5, wherein at least one load element is capable of generating a synchronization signal and of transmitting the synchronization signal to another circuit element, the synchronization signal being for determining a timing of generation of a notification signal for the energy harvesting element or the load element to notify another circuit element that the energy harvesting element or the load element is present.

20. The power wiring network apparatus of claim 7, wherein the notification signal includes attribute data of the energy harvesting element or the load element, and the attribute data is fixed length modulation data.

\* \* \* \* \*